US011922417B2

(12) United States Patent
Rule et al.

(10) Patent No.: US 11,922,417 B2
(45) Date of Patent: *Mar. 5, 2024

(54) SYSTEMS AND METHODS FOR NEAR FIELD CONTACTLESS CARD COMMUNICATION AND CRYPTOGRAPHIC AUTHENTICATION

(71) Applicant: Capital One Services, LLC, McLean, VA (US)

(72) Inventors: Jeffrey Rule, Chevy Chase, MD (US); Gaurang Bhatt, Herndon, VA (US); Lukiih Cuan, Washington, DC (US); Rocky Guo, Falls Church, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/076,235

(22) Filed: Dec. 6, 2022

(65) Prior Publication Data

US 2023/0169503 A1 Jun. 1, 2023

Related U.S. Application Data

(63) Continuation of application No. 17/161,424, filed on Jan. 28, 2021, now Pat. No. 11,562,358.

(51) Int. Cl.
*G06Q 20/40* (2012.01)
*G06Q 20/32* (2012.01)
(Continued)

(52) U.S. Cl.
CPC ....... *G06Q 20/401* (2013.01); *G06Q 20/3278* (2013.01); *G06Q 20/352* (2013.01); *G06Q 20/38215* (2013.01); *G06Q 2220/00* (2013.01)

(58) Field of Classification Search
CPC ............. G06Q 20/401; G06Q 20/3278; G06Q 20/352; G06Q 20/38215; G06Q 2220/00;
(Continued)

(56) References Cited

U.S. PATENT DOCUMENTS 4,683,553 A 7/1987 Mollier
4,827,113 A 5/1989 Rikuna
(Continued)

FOREIGN PATENT DOCUMENTS

CA 3010336 7/2017
CN 101192295 6/2008
(Continued)

OTHER PUBLICATIONS

Batina, Lejla and Poll, Erik, "SmartCards and RFID," PowerPoint Presentation for IPA Security Course, Digital Security at University of Nijmegen, Netherlands (date unknown), 75 pages.

(Continued)

*Primary Examiner* — Patrick McAtee
*Assistant Examiner* — Vincent I Idiake
(74) *Attorney, Agent, or Firm* — KDW FIRM PLLC; Andrew D. Kasnevich

(57) ABSTRACT

Systems and methods for authentication may include an authentication server. The authentication server may include a processor and a memory. The processor may be configured to receive a cryptogram associated with a first near field communication data exchange format (NDEF) read. The processor may be configured to perform a first factor authentication of the cryptogram. The processor may be configured to receive a first data set, wherein the first data set is associated with a second NDEF read. The processor may be configured to extract metadata from the first data set. The processor may be configured to perform, after the first factor authentication, a second factor authentication based on the
(Continued)

metadata. The processor may be configured to generate a message indicative of an outcome of the second factor authentication. The processor may be configured to transmit the message that instructs the processor to effectuate one or more actions.

20 Claims, 7 Drawing Sheets

(51) Int. Cl.
*G06Q 20/34* (2012.01)
*G06Q 20/38* (2012.01)

(58) Field of Classification Search
CPC .......... G06Q 20/389; G06Q 20/40975; G06Q 20/341
See application file for complete search history.

(56) References Cited

U.S. PATENT DOCUMENTS

| | | |
|---|---|---|
| 4,910,773 A | 3/1990 | Hazard et al. |
| 5,036,461 A | 7/1991 | Elliott et al. |
| 5,363,448 A | 11/1994 | Koopman, Jr. et al. |
| 5,377,270 A | 12/1994 | Koopman, Jr. et al. |
| 5,533,126 A | 7/1996 | Hazard |
| 5,537,314 A | 7/1996 | Kanter |
| 5,592,553 A | 1/1997 | Guski et al. |
| 5,616,901 A | 4/1997 | Crandall |
| 5,666,415 A | 9/1997 | Kaufman |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,008 A * | 8/2000 | Davis .................... G06Q 20/04 705/41 |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Mamdani et al. |
| 8,005,426 B2 | 8/2011 | Huomo et al. |
| 8,010,405 B1 | 8/2011 | Bortolin et al. |
| RE42,762 E | 9/2011 | Shin |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |

(56) References Cited

U.S. PATENT DOCUMENTS

| | | |
|---|---|---|
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Vernon et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |
| 8,589,335 B2 | 11/2013 | Smith et al. |
| 8,594,730 B2 | 11/2013 | Bona et al. |
| 8,615,468 B2 | 12/2013 | Varadarajan |
| 8,620,218 B2 | 12/2013 | Awad |
| 8,667,285 B2 | 3/2014 | Coulier et al. |
| 8,723,941 B1 | 5/2014 | Shirbabadi et al. |
| 8,726,405 B1 | 5/2014 | Bailey et al. |
| 8,740,073 B2 | 6/2014 | Vijayshankar et al. |
| 8,750,514 B2 | 6/2014 | Gallo et al. |
| 8,752,189 B2 | 6/2014 | De Jong |
| 8,794,509 B2 | 8/2014 | Bishop et al. |
| 8,799,668 B2 | 8/2014 | Cheng |
| 8,806,592 B2 | 8/2014 | Ganesan |
| 8,807,440 B1 | 8/2014 | Von Behren et al. |
| 8,811,892 B2 | 8/2014 | Khan et al. |
| 8,814,039 B2 | 8/2014 | Bishop et al. |
| 8,814,052 B2 | 8/2014 | Bona et al. |
| 8,818,867 B2 | 8/2014 | Baldwin et al. |
| 8,850,538 B1 | 9/2014 | Vernon et al. |
| 8,861,733 B2 | 10/2014 | Benteo et al. |
| 8,880,027 B1 | 11/2014 | Darringer |
| 8,888,002 B2 | 11/2014 | Chesney et al. |
| 8,898,088 B2 | 11/2014 | Springer et al. |
| 8,934,837 B2 | 1/2015 | Zhu et al. |
| 8,977,569 B2 | 3/2015 | Rao |
| 8,994,498 B2 | 3/2015 | Agrafioti et al. |
| 9,004,365 B2 | 4/2015 | Bona et al. |
| 9,038,894 B2 | 5/2015 | Khalid |
| 9,042,814 B2 | 5/2015 | Royston et al. |
| 9,047,531 B2 | 6/2015 | Showering et al. |
| 9,069,976 B2 | 6/2015 | Toole et al. |
| 9,081,948 B2 | 7/2015 | Magne |
| 9,104,853 B2 | 8/2015 | Venkataramani et al. |
| 9,118,663 B1 | 8/2015 | Bailey et al. |
| 9,122,964 B2 | 9/2015 | Krawczewicz |
| 9,129,280 B2 | 9/2015 | Bona et al. |
| 9,152,832 B2 | 10/2015 | Royston et al. |
| 9,203,800 B2 | 12/2015 | Izu et al. |
| 9,209,867 B2 | 12/2015 | Royston |
| 9,251,330 B2 | 2/2016 | Boivie et al. |
| 9,251,518 B2 | 2/2016 | Levin et al. |
| 9,258,715 B2 | 2/2016 | Borghei |
| 9,270,337 B2 | 2/2016 | Zhu et al. |
| 9,306,626 B2 | 4/2016 | Hall et al. |
| 9,306,942 B1 | 4/2016 | Bailey et al. |
| 9,324,066 B2 | 4/2016 | Archer et al. |
| 9,324,067 B2 | 4/2016 | Van Os et al. |
| 9,332,433 B1* | 5/2016 | Dotan ................ H04L 63/0815 |
| 9,332,587 B2 | 5/2016 | Salahshoor |
| 9,338,622 B2 | 5/2016 | Bjontegard |
| 9,373,141 B1 | 6/2016 | Shakkarwar |
| 9,379,841 B2 | 6/2016 | Fine et al. |
| 9,413,430 B2 | 8/2016 | Royston et al. |
| 9,413,768 B1 | 8/2016 | Gregg et al. |
| 9,420,496 B1 | 8/2016 | Indurkar |
| 9,426,132 B1 | 8/2016 | Alikhani |
| 9,432,087 B2* | 8/2016 | Lee .................... H04B 5/0031 |
| 9,432,339 B1 | 8/2016 | Bowness |
| 9,455,968 B1 | 9/2016 | Machani et al. |
| 9,473,509 B2 | 10/2016 | Arsanjani et al. |
| 9,491,626 B2 | 11/2016 | Sharma et al. |
| 9,553,637 B2 | 1/2017 | Yang et al. |
| 9,619,952 B1 | 4/2017 | Zhao et al. |
| 9,635,000 B1 | 4/2017 | Muftic |
| 9,665,858 B1 | 5/2017 | Kumar |
| 9,674,705 B2 | 6/2017 | Rose et al. |
| 9,679,286 B2 | 6/2017 | Colnot et al. |
| 9,680,942 B2 | 6/2017 | Dimmick |
| 9,710,804 B2 | 7/2017 | Zhou et al. |
| 9,740,342 B2 | 8/2017 | Paulsen et al. |
| 9,740,988 B1 | 8/2017 | Levin et al. |
| 9,763,097 B2 | 9/2017 | Robinson et al. |
| 9,767,329 B2 | 9/2017 | Forster |
| 9,769,662 B1 | 9/2017 | Queru |
| 9,773,151 B2 | 9/2017 | Mil'shtein et al. |
| 9,780,953 B2 | 10/2017 | Gaddam et al. |
| 9,891,823 B2 | 2/2018 | Feng et al. |
| 9,940,571 B1 | 4/2018 | Herrington |
| 9,953,323 B2 | 4/2018 | Candelore et al. |
| 9,961,194 B1 | 5/2018 | Wiechman et al. |
| 9,965,756 B2 | 5/2018 | Davis et al. |
| 9,965,911 B2 | 5/2018 | Wishne |
| 9,978,058 B2 | 5/2018 | Wurmfeld et al. |
| 10,043,164 B2 | 8/2018 | Dogin et al. |
| 10,075,437 B1 | 9/2018 | Costigan et al. |
| 10,129,648 B1 | 11/2018 | Hernandez et al. |
| 10,133,979 B1 | 11/2018 | Eidam et al. |
| 10,217,105 B1 | 2/2019 | Sangi et al. |
| 10,339,531 B2* | 7/2019 | Khurana ............... H04W 12/06 |
| 10,541,995 B1 | 1/2020 | Mossler et al. |
| 11,010,752 B1* | 5/2021 | Gupta ................ G06Q 20/4012 |
| 2001/0010723 A1 | 8/2001 | Pinkas |
| 2001/0029485 A1 | 10/2001 | Brody et al. |
| 2001/0034702 A1 | 10/2001 | Mockett et al. |
| 2001/0054003 A1 | 12/2001 | Chien et al. |
| 2002/0078345 A1 | 6/2002 | Sandhu et al. |
| 2002/0093530 A1 | 7/2002 | Krothapalli et al. |
| 2002/0100808 A1 | 8/2002 | Norwood et al. |
| 2002/0120583 A1 | 8/2002 | Keresman, III et al. |
| 2002/0152116 A1 | 10/2002 | Yan et al. |
| 2002/0153424 A1 | 10/2002 | Li |
| 2002/0165827 A1 | 11/2002 | Gien et al. |
| 2003/0023554 A1 | 1/2003 | Yap et al. |
| 2003/0034873 A1 | 2/2003 | Chase et al. |
| 2003/0055727 A1 | 3/2003 | Walker et al. |
| 2003/0078882 A1 | 4/2003 | Sukeda et al. |
| 2003/0167350 A1 | 9/2003 | Davis et al. |
| 2003/0208449 A1 | 11/2003 | Diao |
| 2004/0015958 A1 | 1/2004 | Veil et al. |
| 2004/0039919 A1 | 2/2004 | Takayama et al. |
| 2004/0127256 A1 | 7/2004 | Goldthwaite et al. |
| 2004/0215674 A1 | 10/2004 | Odinak et al. |
| 2004/0230799 A1 | 11/2004 | Davis |
| 2005/0044367 A1 | 2/2005 | Gasparini et al. |
| 2005/0075985 A1 | 4/2005 | Cartmell |
| 2005/0081038 A1 | 4/2005 | Arditti Modiano et al. |
| 2005/0138387 A1 | 6/2005 | Lam et al. |
| 2005/0156026 A1 | 7/2005 | Ghosh et al. |
| 2005/0160049 A1 | 7/2005 | Lundholm |
| 2005/0195975 A1 | 9/2005 | Kawakita |
| 2005/0247797 A1 | 11/2005 | Ramachandran |
| 2006/0006230 A1 | 1/2006 | Bear et al. |
| 2006/0040726 A1 | 2/2006 | Szrek et al. |

(56) References Cited

U.S. PATENT DOCUMENTS

| | | |
|---|---|---|
| 2006/0041402 A1 | 2/2006 | Baker |
| 2006/0044153 A1 | 3/2006 | Dawidowsky |
| 2006/0047954 A1 | 3/2006 | Sachdeva et al. |
| 2006/0085848 A1 | 4/2006 | Aissi et al. |
| 2006/0136334 A1 | 6/2006 | Atkinson et al. |
| 2006/0173985 A1 | 8/2006 | Moore |
| 2006/0174331 A1 | 8/2006 | Schuetz |
| 2006/0242698 A1 | 10/2006 | Inskeep et al. |
| 2006/0280338 A1 | 12/2006 | Rabb |
| 2007/0033642 A1 | 2/2007 | Ganesan et al. |
| 2007/0055630 A1 | 3/2007 | Gauthier et al. |
| 2007/0061266 A1 | 3/2007 | Moore et al. |
| 2007/0061487 A1 | 3/2007 | Moore et al. |
| 2007/0116292 A1 | 5/2007 | Kurita et al. |
| 2007/0118745 A1 | 5/2007 | Buer |
| 2007/0197261 A1 | 8/2007 | Humbel |
| 2007/0224969 A1 | 9/2007 | Rao |
| 2007/0241182 A1 | 10/2007 | Buer |
| 2007/0256134 A1 | 11/2007 | Lehtonen et al. |
| 2007/0258594 A1 | 11/2007 | Sandhu et al. |
| 2007/0278291 A1 | 12/2007 | Rans et al. |
| 2008/0008315 A1 | 1/2008 | Fontana et al. |
| 2008/0011831 A1 | 1/2008 | Bonalle et al. |
| 2008/0014867 A1 | 1/2008 | Finn |
| 2008/0035738 A1 | 2/2008 | Mullen |
| 2008/0071681 A1 | 3/2008 | Khalid |
| 2008/0072303 A1 | 3/2008 | Syed |
| 2008/0086767 A1 | 4/2008 | Kulkarni et al. |
| 2008/0103968 A1 | 5/2008 | Bies et al. |
| 2008/0109309 A1 | 5/2008 | Landau et al. |
| 2008/0110983 A1 | 5/2008 | Ashfield |
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Amiel et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Roeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadrajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou |
| 2013/0104251 A1 | 4/2013 | Moore et al. |
| 2013/0106576 A1 | 5/2013 | Hinman et al. |
| 2013/0119130 A1 | 5/2013 | Braams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |

(56) References Cited

U.S. PATENT DOCUMENTS

| | | |
|---|---|---|
| 2014/0081720 A1 | 3/2014 | Wu |
| 2014/0108263 A1* | 4/2014 | Ortiz ............... G06Q 20/3278 705/44 |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0032635 A1 | 1/2015 | Guise |
| 2015/0071486 A1 | 3/2015 | Rhoads et al. |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170138 A1 | 6/2015 | Rao |
| 2015/0178724 A1 | 6/2015 | Ngo et al. |
| 2015/0178774 A1* | 6/2015 | Vijay ............... G06Q 30/0255 705/14.53 |
| 2015/0186871 A1 | 7/2015 | Laracey |
| 2015/0205379 A1 | 7/2015 | Mag et al. |
| 2015/0302409 A1 | 10/2015 | Malek |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0006009 A1* | 1/2017 | Hessler ............... G06F 21/31 |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0238517 A1 | 8/2019 | D'Agostino et al. |
| 2019/0268325 A1* | 8/2019 | Roper ............... H04L 63/083 |
| 2020/0013051 A1* | 1/2020 | Kadiwala ............ H04L 63/068 |
| 2020/0019725 A1 | 1/2020 | Rule et al. |

FOREIGN PATENT DOCUMENTS

| | | |
|---|---|---|
| CN | 103023643 | 4/2013 |
| CN | 103417202 | 12/2013 |
| EP | 1 085 424 | 3/2001 |
| EP | 1 223 565 | 7/2002 |
| EP | 1 265 186 | 12/2002 |
| EP | 1 783 919 | 5/2007 |
| EP | 2 852 070 | 1/2009 |
| EP | 2 139 196 | 12/2009 |
| EP | 1 469 419 | 2/2012 |
| GB | 2 457 221 | 8/2009 |
| GB | 2 516 861 | 2/2015 |
| GB | 2 551 907 | 1/2018 |
| KR | 101508320 | 4/2015 |
| WO | WO 00/49586 | 8/2000 |
| WO | WO 2006070189 | 7/2006 |
| WO | WO 2008055170 | 5/2008 |
| WO | WO 2009025605 | 2/2009 |
| WO | WO 2010049252 | 5/2010 |
| WO | WO 2011112158 | 9/2011 |
| WO | WO 2012001624 | 1/2012 |
| WO | WO 2013039395 | 3/2013 |
| WO | WO 2013155562 | 10/2013 |
| WO | WO 2013192358 | 12/2013 |
| WO | WO 2014043278 | 3/2014 |
| WO | WO 2014170741 | 10/2014 |
| WO | WO 2015179649 | 11/2015 |
| WO | WO 2015183818 | 12/2015 |
| WO | WO 2016097718 | 6/2016 |
| WO | WO 2016160816 | 10/2016 |
| WO | WO 2016168394 | 10/2016 |
| WO | WO 2017042375 | 3/2017 |
| WO | WO 2017042400 | 3/2017 |
| WO | WO 2017157859 | 9/2017 |
| WO | WO 2017208063 | 12/2017 |

(56) References Cited

FOREIGN PATENT DOCUMENTS

| WO | WO 2018063809 | 4/2018 |
|---|---|---|
| WO | WO 2018137888 | 8/2018 |
| WO | WO 2020072419 | 4/2020 |
| WO | WO 2020072424 | 4/2020 |

OTHER PUBLICATIONS

Haykin M. and Warnar, R., "Smart Card Technology: New Methods for Computer Access Control," Computer Science and Technology NIST Special Publication 500-157:1-60 (1988).

Lehpamer, Harvey, "Component of the RFID System," RFID Design Principles, 2nd edition pp. 133-201 (2012).

Pourghomi, Pardis et al., "A Proposed NFC Payment Application," International Journal of Advanced Computer Science and Applications, vol. 4, No. 8 (2013).

Author Unknown, "CardrefresherSM from American Express®," [online] 2019 [retrieved on Mar. 25, 2019]. Retrieved from Internet URL: https://merchant-channel.americanexpress.com/merchant/en_US/cardrefresher, 2 pages.

Author Unknown, "Add Account Updater to your recurring payment tool," [online] 2018-19 [retrieved on Mar. 25, 2019]. Retrieved from Internet URL: https://www.authorize.net/our-features/account-updater/, 5 pages.

Author Unknown, "VisaR Account Updater for Merchants," [online] 2019 [retrieved on Mar. 25, 2019]. Retrieved from Internet URL: https://usa.visa.com/dam/VCOM/download/merchants/visa-account-updater-product-information-fact-sheet-for-merchants.pdf, 2 pages.

Author Unknown, "Manage the cards that you use with Apple Pay," Apple Support [online] 2019 [retrieved on Mar. 25, 2019]. Retrieved from Internet URL: https://support.apple.com/en-us/HT205583, 5 pages.

Author Unknown, "Contactless Specifications for Payment Systems," EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_20160809023257319.pdf, 52 pages.

Author Unknown, "EMV Integrated Circuit Card Specifications for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

Author unknown, "NFC Guide: All You Need to Know About Near Field Communication" Square Guide [online] 2018[retrieved on Nov. 13, 2018]. Retrieved from Internet URL: https://squareup.com/guides/nfc, 8 pages.

Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.

Cozma, N., "Copy data from other devices in Android 5.0 Lollipop setup" CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.

Kevin, Android Enthusiast, "How to copy text string from nfc tag" StackExchange [online] 2013 [retrieved on Mar. 25, 2019]. Retrieved from the Internet URL: https://android.stackexchange.com/questions/55689/how-to-copy-text-string-from-nfc-tag, 11 pages.

Author unknown, "Tap & Go Device Setup" Samsung [online] date unknown [retrieved on Mar. 25, 2019]. Retrieved from the Internet URL: https://www.samsung.com/us/switch-me/switch-to-the-galaxy-s-5/app/partial/setup-device/tap-go.html, 1 page.

Author Unknown, "Multiple encryption", Wikipedia [online] 2019 [retrieved on Mar. 25, 2019]. Retrieved from Internet URL: https://en.wikipedia.org/wiki/Multiple_encryption, 4 pages.

Krawczyk, et al., "HMAC: Keyed-Hashing for Message Authentication", Network Working Group RFC:2104 memo [online] 1997 [retrieved on Mar. 25, 2019]. Retrieved from Internet URL: https://tools.ietf.org/html/rfc2104, 12 pages.

Song, et al., "The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.

Katz, J., and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Adams, D., and Maier, A-K, "Goldbug BIG SEVEN open source crypto-messengers to be compared—: or Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.

Author Unknown, "Triple DES", Wikipedia [online] 2018 [retrieved on Mar. 25, 2019]. Retrieved from Internet URL: https://simple.wikipedia.org/wiki/Triple_DES, 2 pages.

Song, F., and Yun, A.1, "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.

Saxena, N., "Lecture 10: NMAC, HMAC and Number Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Berg, Guy, "Fundamentals of EMV" Smart Card Alliance [online] date unknown [retrieved on Mar. 27, 2019]. Retrieved from Internet URL: https://www.securetechalliance.org/resources/media/scap13_preconference/02.pdf, 37 pages.

Pierce, Kevin, "Is the amazon echo NFC compatible,?" Amazon.com Customer Q&A [online] 2016 [retrieved on Mar. 26, 2019]. Retrieved from Internet URL: https://www.amazon.com/ask/questions/Tx1RJXYSPE6XLJD?_encodi . . . , 2 pages.

Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.

Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.

van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

Author Unknown, "Autofill", Computer Hope [online] 2018 [retrieved on Mar. 25, 2019]. Retrieved from Internet URL: https://www.computerhope.com/jargon/a/autofill.htm, 2 pages.

Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.

Author unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-ibrw1103/mac, 3 pages.

Menghin, M.J., "Power Optimization Techniques for Near Field Communication Systems" 2014 Dissertation at Technical University of Graz [online]. Retrieved from Internet URL: https://diglib.tugraz.at/download.php?id=576a7b910d2d6&location=browse, 135 pages.

Mareli, M., et al., "Experimental evaluation of NFC reliability between an RFID tag and a smartphone" Conference paper (2013) IEEE AFRICON at Mauritius [online] [retrieved on Mar. 25, 2019]. Retrieved from Internet URL: https://core.ac.uk/download/pdf/54204839.pdf, 5 pages.

Davison, A., et al., "MonoSLAM: Real-Time Single Camera Slam", IEEE Transactions on Pattern Analysis and Machine Intelligence 29(6): 1052-1067 (2007).

Barba, R., "Sharing your location with your bank sounds creepy, but it's also useful", Bankrate, LLC [online] 2017 [retrieved on Mar. 25,

(56) References Cited

OTHER PUBLICATIONS

2019]. Retrieved from Internet URL: https://www.bankrate.com/banking/banking-app-location-sharing/, 6 pages.

Author unknown: "onetappayment™", [online] Jan. 24, 2019, [retrieved on Mar. 25, 2019]. Retrieved from Internet URL: https://www.payubiz.in/onetap, 4 pages.

Vu et al., (2012). "Distinguishing users with capacitive touch communication" Proceedings of the Annual International Conference on Mobile Computing and Networking, MOBICOM. 10.1145/2348543.2348569.

EMVCo, EMV Card Personalization Specification, version 1.0 (Jun. 2003), 81 pages.

Ullmann et al., (2012). "On-Card" User Authentication for Contactless Smart Cards based on Gesture Recognition, LNI, 223-234, 12 pages.

Faraj et al. (2008). "Investigation of Java Smart Card Technology for Multi-Task Applications" J. of Al-Anbar University for Pure Science, vol. 2: No. 1: 2008, 11 pages.

Dhamdhere (2017) "Key Benefits of a Unified Platform for Loyalty, Referral Marketing, and UGC" Annex Cloud [retrieved on Jul. 3, 2019]. Retrieved from Internet URL: https://www.annexcloude.com/blog/benefits-unified-platform/, 13 pages.

International Search Report and the Written Opinion of the International Searching Authority issued in related PCT Application No. PCT/US2022/013970 dated Apr. 28, 2022.

International Preliminary Report on Patentability from related PCT Application No. PCT/US2022/013870, dated Aug. 10, 2023, 7 pages.

* cited by examiner

SYSTEMS AND METHODS FOR NEAR FIELD CONTACTLESS CARD COMMUNICATION AND CRYPTOGRAPHIC AUTHENTICATION

CROSS-REFERENCE TO RELATED APPLICATIONS

The subject application is a continuation of U.S. patent application Ser. No. 17/680,080 filed Feb. 24, 2022, which is a continuation of U.S. patent application Ser. No. 16/659,327 filed Oct. 21, 2019, now U.S. Pat. No. 11,444,775, which is a continuation of U.S. patent application Ser. No. 16/351,433 filed Mar. 12, 2019, now U.S. Pat. No. 10,511,443, which is a continuation in part of U.S. patent application Ser. No. 16/205,119 filed Nov. 29, 2018, now U.S. Pat. No. 10,581,611, which claims the benefit of U.S. Provisional Patent Application No. 62/740,352 filed Oct. 2, 2018, the contents of which are hereby incorporated by reference in their entireties.

FIELD OF THE DISCLOSURE

The present disclosure relates to systems and methods for contactless card communication and, more specifically, for near field communication and cryptographic authentication of contactless cards.

BACKGROUND

Card-based operations have many data points stored in its chip that may be sent to a device in communication with the card upon a card swipe or other data transfer. These operations often involve the use of a card in communication with a point of sale (POS) device, a server, or other device, which may also send information back to the card. It is necessary to protect such communications from interception and unauthorized access.

However, transmission of data without encryption or other protection is susceptible to interception, replay and other attacks, and may be subject to other vulnerabilities, resulting in increased security risks and increased risks of account or card misuse. These risks may be further increased through the use of contactless cards, which communicate with other devices wirelessly.

Measures taken to address security risk may consume system resources and hinder operational efficiency. For large numbers of operations, the consumption of system resources and the hindrance of operation efficiency can increase, which may result in a failure to perform operations or unsatisfactory performance.

These and other deficiencies exist. Accordingly, there is a need for systems and methods for authentication that overcome these deficiencies by protecting communications from interception and unauthorized access in a secure and reliable manner.

SUMMARY OF THE DISCLOSURE

Embodiments of the present disclosure provide an authentication server. The authentication server may include a processor and a memory. The processor may be configured to receive a cryptogram associated with a first near field communication data exchange format (NDEF) read. The processor may be configured to perform a first factor authentication of the cryptogram. The processor may be configured to receive a first data set, wherein the first data set is associated with a second NDEF read. The processor may be configured to extract metadata from the first data set. The processor may be configured to perform, after the first factor authentication, a second factor authentication based on the metadata. The processor may be configured to generate a message indicative of an outcome of the second factor authentication. The processor may be configured to transmit the message that instructs the processor to effectuate one or more actions.

Embodiments of the present disclosure provide a method of authentication. The method may include receiving a cryptogram associated with a first near field communication data exchange format (NDEF) read. The method may include performing a first factor authentication. The method may include receiving a first data set, wherein the first data set is associated with a second NDEF read. The method may include extracting metadata from the first data set. The method may include performing, after the first factor authentication, a second factor authentication based on the metadata. The method may include generating a message indicative of an outcome of the second factor authentication. The method may include transmitting the message that instructs the processor to effectuate one or more actions.

Embodiments of the present disclosure provide a computer readable non-transitory medium comprising computer executable instructions that, when executed on a processor, perform procedures comprising the steps of: receiving a cryptogram associated with a first near field communication data exchange format (NDEF) read; performing a first factor authentication; receiving a first data set, wherein the first data set is associated with a second NDEF read; extracting metadata from the first data set; performing, after the first factor authentication, a second factor authentication based on metadata; performing, after the second factor authentication, a third factor authentication by generating one or more prompts associated with one or more queries; transmitting, via one or more notifications, the one or more prompts; receiving input responsive to the one or more queries; authenticating the input; and converting, after authenticating the input, a first type of operation to a second type of operation.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
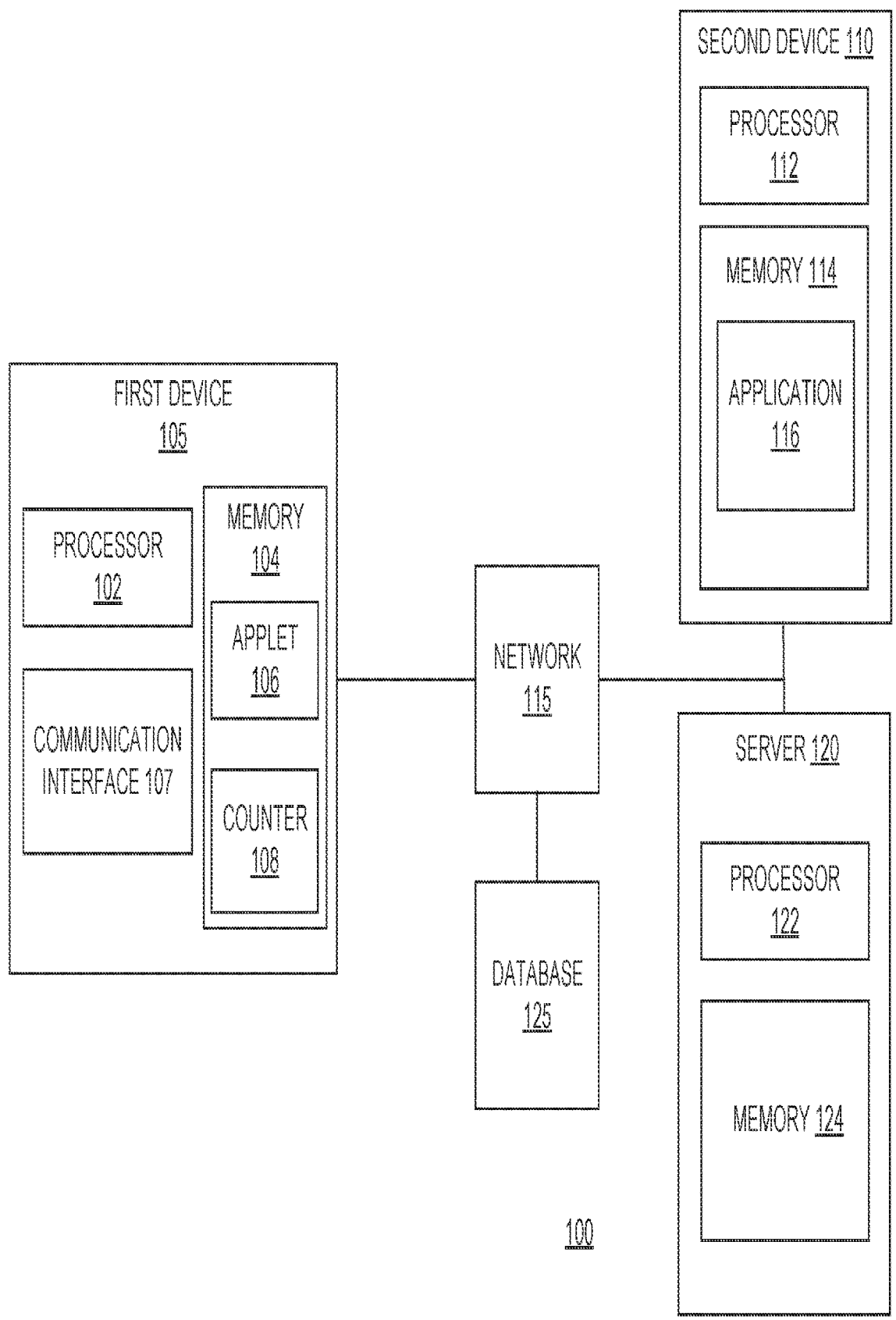
FIG. 1 depicts an authentication system according to an exemplary embodiment.

The following description of embodiments provides non-limiting representative examples referencing numerals to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

The systems and methods disclosed herein convert a card-not-present transaction to a card-present transaction, which results in reduced risk and lower fraud rate. The card-not-present transaction may be created based on a variety of input parameters, including but not limited to primary account number, card verification value, and expiration date. Upon entry into a communication field of a device, the card may be authenticated via first factor authentication and also configured to transmit a first data set to an application comprising instructions for execution on the device for second factor authentication in order to convert a first type of operation to a second type of operation. This may be accomplished by reading data from the card for the last several transactions, which would be compared by a server with data stored or otherwise accessible on known transactions. In addition, the application may be configured to ask the user one or more questions for answers as a third factor authentication. In this manner, multi-factor authentication may be utilized to protect communications that are susceptible to phishing and replay attacks, thereby mitigating security risks and risks of account or card misuse.

Benefits of the systems and methods disclosed herein include improved authentication by protecting communications from interception and unauthorized access. The systems and methods disclosed herein allow for the avoidance of data interception, phishing attacks, and replay attacks through encrypted data communications, and the reduction of other security vulnerabilities.

In addition, numerous authentication factors may be performed and customized queries may be transmitted via prompts to improve authentication. By doing so, security risks can be further mitigated and transaction efficiency can be improved.

These features can be implemented without degrading the user experience by burdening the user with unnecessary security tasks. Further, these features can be performed in a manner that allows for the time-efficient performance of transactions, in order to comply with user expectations and transaction requirements.

Accordingly, the systems and methods disclosed herein reduce the risk of fraudulent activity, such as misuse of the card or an account associated with the card. Systems and methods disclosed herein improve upon implementations that lack secure authentication. These benefits may be advantageously achieved while promoting system efficiency and avoiding degradation of the user experience.

FIG. 1 illustrates an authentication system 100. The system 100 may comprise a first device 105, a second device 110, a network 115, a server 120, and a database 125. Although FIG. 1 illustrates single instances of components of system 100, system 100 may include any number of components.

System 100 may include a first device 105. The first device 105 may comprise a contactless card, a contact-based card, a network-enabled computer, or other device described herein. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. As further explained below in FIGS. 2A-2B, first device 105 may include one or more processors 102, and memory 104. Memory 104 may include one or more applets 106 and one or more counters 108. Each counter 108 may include a counter value. Memory 104 may include the counter value, transmission data, and at least one key.

First device 105 may include a communication interface 107. The communication interface 107 may comprise communication capabilities with physical interfaces and contactless interfaces. For example, the communication interface 107 may be configured to communicate with a physical interface, such as by swiping through a card swipe interface or inserting into a card chip reader found on an automated teller machine (ATM) or other device configured to communicate over a physical interface. In other examples, the communication interface 107 may be configured to establish contactless communication with a card reading device via a short-range wireless communication method, such as NFC, Bluetooth, Wi-Fi, RFID, and other forms of contactless communication. As shown in FIG. 1, the communication interface 107 may be configured to communicate directly with the second device 110, server 120, and/or database 125 via network 115.

First device 105 may be in data communication with any number of components of system 100. For example, first device 105 may transmit data via network 115 to second device 110, and/or server 120. First device 105 may transmit data via network 115 to database 125. In some examples, first device 105 may be configured to transmit data via network 115 after entry into one or more communication fields of any device. Without limitation, each entry may be associated with a tap, a swipe, a wave, and/or any combination thereof.

System 100 may include a second device 110. The second device 110 may include one or more processors 112, and memory 114. Memory 114 may include one or more applications, including but not limited to application 116. Second device 110 may be in data communication with any number of components of system 100. For example, second device 110 may transmit data via network 115 to server 120. Second device 110 may transmit data via network 115 to database 125. Without limitation, second device 110 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, a kiosk, a tablet, a terminal, or other device. Second device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The second device 110 may include processing circuitry and may contain additional components, including processors, memories, error and parity/CRC checkers, data encoders, anticollision algorithms, controllers, command decoders, security primitives and tamperproofing hardware, as necessary to perform the functions described herein. The second device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include a network 115. In some examples, network 115 may be one or more of a wireless network, a wired network or any combination of wireless network and wired network, and may be configured to connect to any one of components of system 100. For example, first device 105 may be configured to connect to server 120 via network 115. In some examples, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may comprise a plurality of interconnected networks, such as, for example, the Internet, a service provider's network, a cable television network, corporate networks, such as credit card association networks, and home networks.

System 100 may include one or more servers 120. In some examples, server 120 may include one or more processors 122 coupled to memory 124. Server 120 may be configured as a central system, server or platform to control and call various data at different times to execute a plurality of workflow actions. Server 120 may be configured to connect to first device 105. Server 120 may be in data communication with the applet 106 and/or application 116. For example, a server 120 may be in data communication with applet 106 via one or more networks 115. First device 105 may be in communication with one or more servers 120 via one or more networks 115, and may operate as a respective front-end to back-end pair with server 120. First device 105 may transmit, for example from applet 106 executing thereon, one or more requests to server 120. The one or more requests may be associated with retrieving data from server 120. Server 120 may receive the one or more requests from first device 105. Based on the one or more requests from applet 106, server 120 may be configured to retrieve the requested data. Server 120 may be configured to transmit the received data to applet 106, the received data being responsive to one or more requests.

In some examples, server 120 can be a dedicated server computer, such as bladed servers, or can be personal computers, laptop computers, notebook computers, palm top computers, network computers, mobile devices, wearable devices, or any processor-controlled device capable of supporting the system 100. While FIG. 1 illustrates a single server 120, it is understood that other embodiments can use multiple servers or multiple computer systems as necessary or desired to support the users and can also use back-up or redundant servers to prevent network downtime in the event of a failure of a particular server.

Server 120 may include an application comprising instructions for execution thereon. For example, the application may comprise instructions for execution on the server 120. The application of the server 120 may be in communication with any components of system 100. For example, server 120 may execute one or more applications that enable, for example, network and/or data communications with one or more components of system 100 and transmit and/or receive data. Without limitation, server 120 may be a network-enabled computer. As referred to herein, a network-enabled computer may include, but is not limited to a computer device, or communications device including, e.g., a server, a network appliance, a personal computer, a workstation, a phone, a handheld PC, a personal digital assistant, a contactless card, a thin client, a fat client, an Internet browser, or other device. Server 120 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The server 120 may include processing circuitry and may contain additional components, including processors, memories, error and parity/CRC checkers, data encoders, anticollision algorithms, controllers, command decoders, security primitives and tamperproofing hardware, as necessary to perform the functions described herein. The server 120 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

System 100 may include one or more databases 125. The database 125 may comprise a relational database, a non-relational database, or other database implementations, and any combination thereof, including a plurality of relational databases and non-relational databases. In some examples, the database 125 may comprise a desktop database, a mobile database, or an in-memory database. Further, the database 125 may be hosted internally by any component of system 100, such as the first device 105 or server 120, or the database 125 may be hosted externally to any component of the system 100, such as the first device 105 or server 120, by a cloud-based platform, or in any storage device that is in data communication with the first device 105 and server 120. In some examples, database 125 may be in data communication with any number of components of system 100. For example, server 120 may be configured to retrieve the requested data from the database 125 that is transmitted by applet 106. Server 120 may be configured to transmit the received data from database 125 to applet 106 via network 115, the received data being responsive to the transmitted one or more requests. In other examples, applet 106 may be configured to transmit one or more requests for the requested data from database 125 via network 115.

In some examples, exemplary procedures in accordance with the present disclosure described herein can be performed by a processing arrangement and/or a computing arrangement (e.g., computer hardware arrangement). Such processing/computing arrangement can be, for example entirely or a part of, or include, but not limited to, a computer/processor that can include, for example one or more microprocessors, and use instructions stored on a computer-accessible medium (e.g., RAM, ROM, hard drive, or other storage device). For example, a computer-accessible medium can be part of the memory of the first device 105, second device 110, server 120, and/or database 125, or other computer hardware arrangement.

In some examples, a computer-accessible medium (e.g., as described herein above, a storage device such as a hard disk, floppy disk, memory stick, CD-ROM, RAM, ROM, etc., or a collection thereof) can be provided (e.g., in communication with the processing arrangement). The computer-accessible medium can contain executable instructions thereon. In addition or alternatively, a storage arrangement can be provided separately from the computer-accessible medium, which can provide the instructions to the processing arrangement so as to configure the processing arrangement to execute certain exemplary procedures, processes, and methods, as described herein above, for example.

The application 116 of the client device 110 may be configured to conduct one or more reads of a card 105 as part of a first factor authentication. For example, the application 116 may be configured to conduct a read, such as a near field communication read, of a tag, such as a near field communication tag, of the card 105. The card 105 may be configured to transmit a cryptogram. For example, the card 105 may be configured to transmit, after entry into one or more communication fields of any device, data responsive to the read, such as a first read, via a communication interface 107 of the card 105. In some examples, the card 105 may be configured to transmit, after a first entry into a first communication field of the device 110, the cryptogram. Without limitation, each entry may be associated with a tap, a swipe, a wave, and/or any combination thereof. The application 116 of the client device 110 may be configured to receive the cryptogram transmitted by the card 105. The cryptogram may be generated based on a first read of the tag of the card 105. For example, the cryptogram may be obtained via a near field communication data exchange format (NDEF) read. In some examples, the card 105 may be configured to encrypt the cryptogram prior to its transmission.

The application 116 of the client device 110 may be configured to transmit the cryptogram that it received from the card 105 to a server 120. In some examples, the server 120 may be configured to receive the cryptogram transmitted by the card 105. The server 120 may be configured to decrypt the cryptogram as part of the first factor authentication. In other examples, the application 116 of the client device 110 may be configured to decrypt the cryptogram as part of the first factor authentication.

The server 120 may be configured to transmit one or more messages to the application 116 of the client device 110. For example, one of the messages may comprise an indication of authentication status of the cryptogram. For example, the server 120 may be configure to transmit a message to the application 116 of the client device 110 that is indicative of authentication validation, such as a successful authentication status of the cryptogram. To the extent that the server 120 is unable to authenticate the cryptogram, the server 120 may be configured to transmit a message indicative of an unsuccessful authentication status of the cryptogram. If the cryptogram is not successfully authenticated, the server 120 may be configured to instruct, via one or more commands, the client application 116 of the client device 110 to re-read the tag of the card 105 to receive the cryptogram. In this manner, the server 120 may be configured to decrypt the cryptogram as part of the first factor authentication.

The application 116 of the device 110 may be configured to receive the one or more messages from the server 120. The application 116 of the device 110 may be configured to perform, after the first factor authentication, another read. For example, the application 116 of the device 110 may be configured to perform a second read of the card 105. The card 105 may be configured to transmit, after the second read, a first data set. For example, the first data set may be obtained via the second read, such as a near field communication data exchange format (NDEF) read. The first data set may be transmitted by the card 105 to the application 116 of the client device 110 via the second read. The first data set may comprise one or more sets of prior data. Without limitation, the first data set may include data for the last three transactions, such as an identifier associated with the first data set, a type of first data set, method of entry into the communication field, time stamp, and amount. The second read may be associated with one or more gestures, including but not limited to a tap, a swipe, or a wave, that represent any number of entries of a communication interface 107 of the card 105 into a communication field of the device.

Prior to performance of a second factor authentication, the application 116 of the client device 110, or server 120, may be configured to extract metadata from the first data set. The metadata may be extracted from the first device 105. In some examples, the second factor authentication may include authentication of metadata. For example, the second factor authentication may comprise authentication of metadata of the first device 105, such as the card. In some examples, the metadata belonging to the first device 105 may be personalized at the time of creation of first device 105, for example by the issuer. The metadata of first device 105 may be customized such that it is populated to include, without limitation, a plurality of fields comprising one or more prior transactions (including merchant and transaction data for a predetermined number of transactions, e.g., five transactions), one or more transaction date stamps and/or time stamps, one or more phone numbers, one or more addresses, and/or combination thereof and/or any other personally identifiable information that is capable of being authenticated. In some examples, the mobile phone number associated with the user or account may be read from the first device 105, and a second factor authentication may be transmitted to application 116 of client device 110. For example, the second factor authentication may comprise a short message system one-time password received by application 116 of client device 110.

The application 116 of the client device 110 may be configured to perform a second factor authentication. For example, the one or more sets of prior data may be evaluated against one or more reference sets of prior data as part of the second factor authentication. In other examples, the application 116 of the client device 110 may be configured to transmit the first data set to the server 120 for evaluation as part of the second factor authentication. The application 116 of the client device 110 may be configured to generate an outcome of the second factor authentication by comparing the one or more sets of prior data to one or more reference sets of prior data. Based on the outcome of the second factor authentication, the application 116 of the client device 110 may be configured to generate and display one or more messages that are indicative of the outcome of the second factor authentication.

The application 116 of the client device 110 may be configured to perform a third factor authentication. The third factor authentication may be performed prior to conversion of a first type of operation to a second type of operation by the application 116 of the client device 110. In other examples, the server 120 or application 116 of the client device 110 may be configured to generate, transmit and/or receive one or more messages indicative of the outcome of the second factor authentication. For example, at least one of the messages may be configured to instruct the application 116 or server 120 to effectuate one or more actions. The one or more actions may include conversion of the first type of operation to a second type of operation. For example, the first type of operation may comprise a card-not-present transaction. The second type of operation may comprise a card-present transaction. In this manner, the conversion may allow for improved security by indicating that the card was present for performing one or more operations, such as capturing a communication with card readers, contactless or contact-enabled terminals. In this manner, the conversion from the first type of operation to the second type of operation may be dependent on the outcome, such as the successful outcome, of the second factor authentication, since the first device 105 will be have been proven to be in physical possession of the user, thereby distinguishing between a card-present transaction and a card-not-present transaction. Moreover, the third factor authentication may be performed after the second factor authentication. For example, the application 116 of the client device 110 may be configured to perform the third factor authentication by generating one or more prompts that are transmitted via one or more notifications. In some examples, the third factor authentication may be performed by prompting, via the one or more notifications, input that is responsive to one or more queries.

Without limitation, the one or more queries may include at least one selected from the group of a primary account number, cardholder identifier such as first name, middle name, last name, a type of operation, a date, a nationality of the cardholder, a cardholder language, an address, a date of birth, an email, a telephone number, an expiration date, a credit card number, a debit card number, and/or any combination thereof. Moreover, the one or more queries may include a request for a partial portion, including but not limited to a redacted portion, of any number of these queries. The one or more queries may resemble knowledge-based authentication that form the basis of the third factor authentication.

The application 116 of the client device 110 may be configured to receive input that is responsive to the one or more queries. For example, the input to the one or more queries may include a response that includes an answer as to how many times the user shopped at a particular merchant, or conducted an operation with a specified reader or terminal, within a time frame. In another example, the input to the one or more queries may include a response that includes an answer as to how many items were associated with the most recent purchase. In another example, the input to the one or more queries may include a response that includes an amount spent associated with the most recent purchase. In another example, the input to the one or more queries may include a response that includes an answer as to a location and/or an identity of the last two transactions.

Figure 2A:
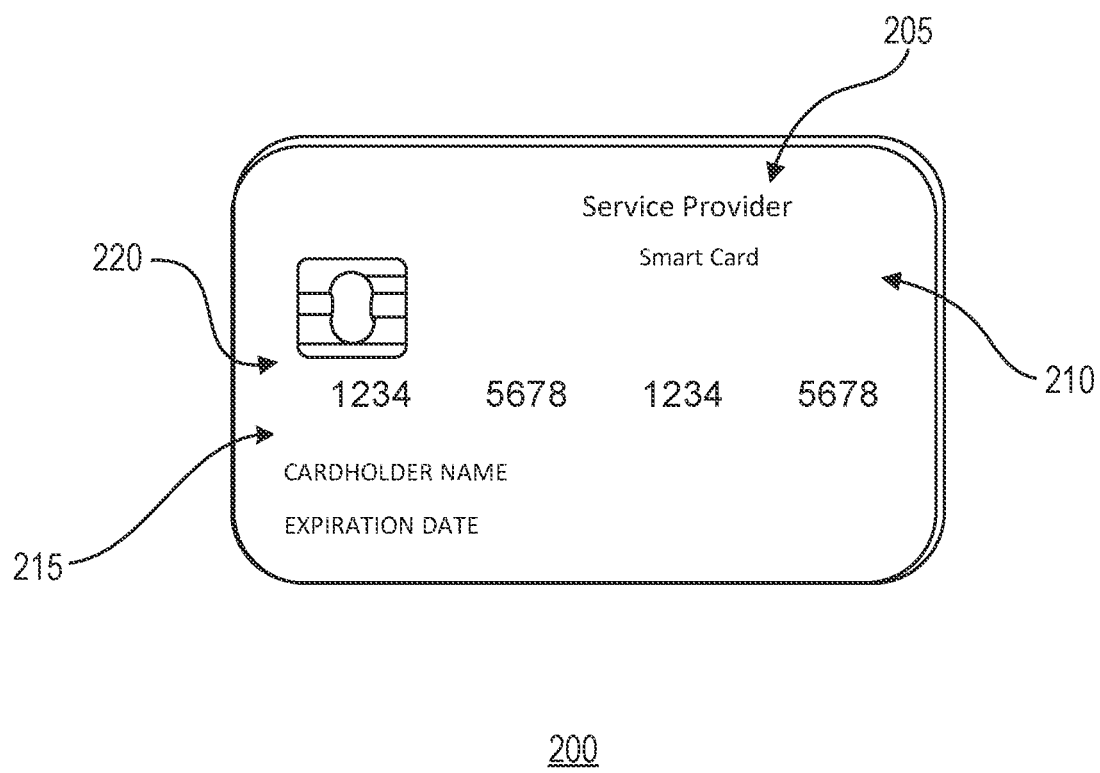
FIG. 2A is an illustration of a contactless card according to an exemplary embodiment.

FIG. 2A illustrates one or more first devices 200. First device 200 may reference the same or similar components of first device 105, as explained above with respect to FIG. 1. Although FIGS. 2A and 2B illustrate single instances of components of first device 200, any number of components may be utilized.

First device 200 may be configured to communicate with one or more components of system 100. First device 200 may comprise a contact-based card or contactless card, which may comprise a payment card, such as a credit card, debit card, or gift card, issued by a service provider 205 displayed on the front or back of the contactless card 200. In some examples, the contactless card 200 is not related to a payment card, and may comprise, without limitation, an identification card, a membership card, and a transportation card. In some examples, the payment card may comprise a dual interface contactless payment card. The contactless card 200 may comprise a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 200 may have physical characteristics compliant with the ID-1 format of the ISO/IEC 7810 standard, and the contactless card may otherwise be compliant with the ISO/IEC 14443 standard. However, it is understood that the contactless card 200 according to the present disclosure may have different characteristics, and the present disclosure does not require a contactless card to be implemented in a payment card.

The contactless card 200 may also include identification information 215 displayed on the front and/or back of the card, and a contact pad 220. The contact pad 220 may be configured to establish contact with another communication device, including but not limited to a user device, smart phone, laptop, desktop, or tablet computer. The contactless card 200 may also include processing circuitry, antenna and other components not shown in FIG. 2A. These components may be located behind the contact pad 220 or elsewhere on the substrate 210. The contactless card 200 may also include a magnetic strip or tape, which may be located on the back of the card (not shown in FIG. 2A).

Figure 2B:
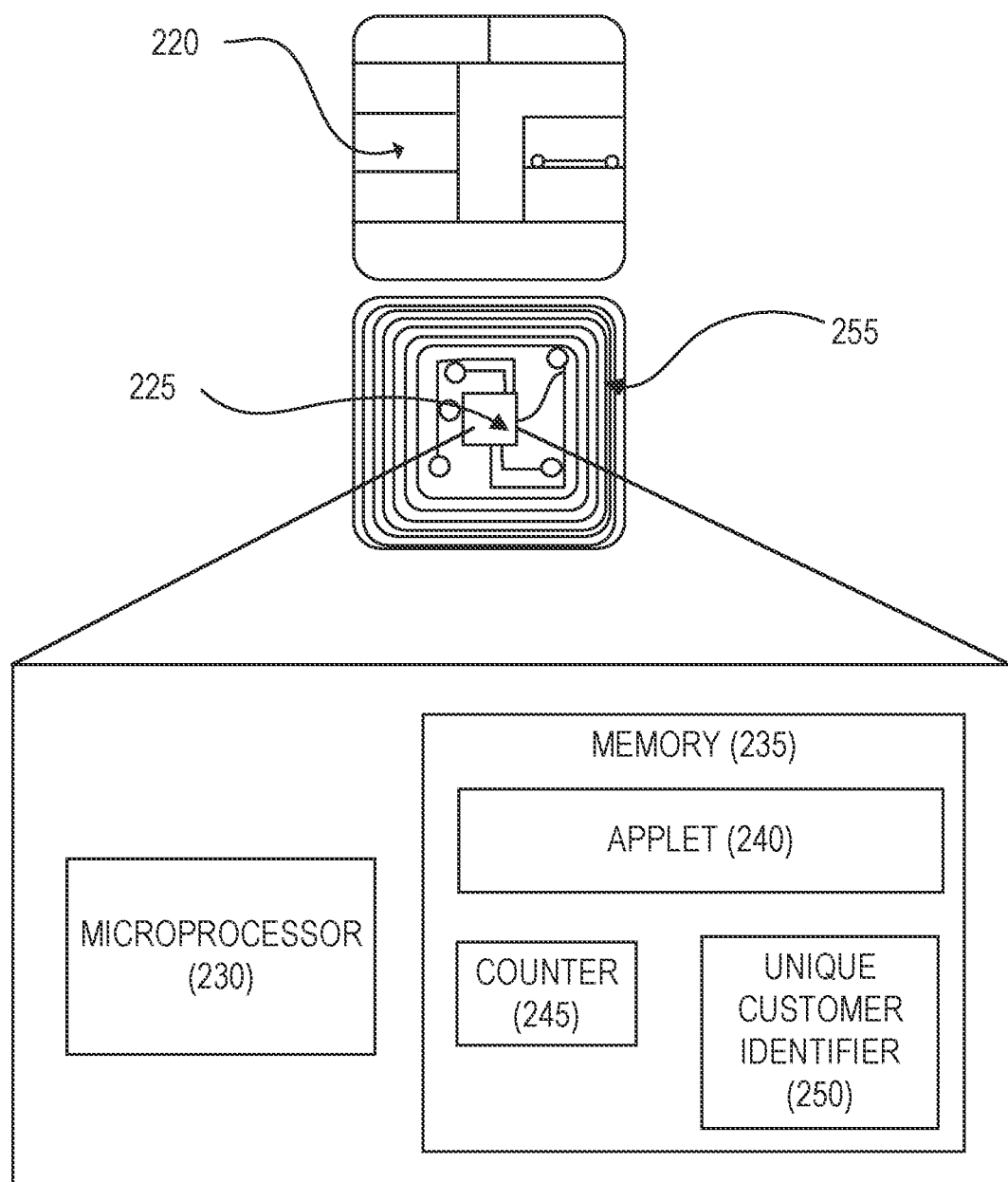
FIG. 2B is an illustration of a contact pad of a contactless card according to an exemplary embodiment.

As illustrated in FIG. 2B, the contact pad 220 of FIG. 2A may include processing circuitry 225 for storing and processing information, including a processor 230, such as a microprocessor, and a memory 235. It is understood that the processing circuitry 225 may contain additional components, including processors, memories, error and parity/CRC checkers, data encoders, anticollision algorithms, controllers, command decoders, security primitives and tamper-proofing hardware, as necessary to perform the functions described herein.

The memory 235 may be a read-only memory, write-once read-multiple memory or read/write memory, e.g., RAM, ROM, and EEPROM, and the contactless card 200 may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. It may also be read many times.

The memory 235 may be configured to store one or more applets 240, one or more counters 245, and a customer identifier 250. The one or more applets 240 may comprise one or more software applications configured to execute on one or more contactless cards, such as Java Card applet. However, it is understood that applets 240 are not limited to Java Card applets, and instead may be any software application operable on contactless cards or other devices having limited memory. The one or more counters 245 may comprise a numeric counter sufficient to store an integer. The customer identifier 250 may comprise a unique alphanumeric identifier assigned to a user of the contactless card 200, and the identifier may distinguish the user of the contactless card from other contactless card users. In some examples, the customer identifier 250 may identify both a customer and an account assigned to that customer and may further identify the contactless card associated with the customer's account.

The processor and memory elements of the foregoing exemplary embodiments are described with reference to the contact pad, but the present disclosure is not limited thereto. It is understood that these elements may be implemented outside of the contact pad 220 or entirely separate from it, or as further elements in addition to processor 230 and memory 235 elements located within the contact pad 220.

In some examples, the contactless card 200 may comprise one or more antennas 255. The one or more antennas 255 may be placed within the contactless card 200 and around the processing circuitry 225 of the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225.

In an embodiment, the coil of contactless card 200 may act as the secondary of an air core transformer. The terminal may communicate with the contactless card 200 by cutting power or amplitude modulation. The contactless card 200 may infer the data transmitted from the terminal using the gaps in the contactless card's power connection, which may be functionally maintained through one or more capacitors. The contactless card 200 may communicate back by switching a load on the contactless card's coil or load modulation. Load modulation may be detected in the terminal's coil through interference.

Figure 3:
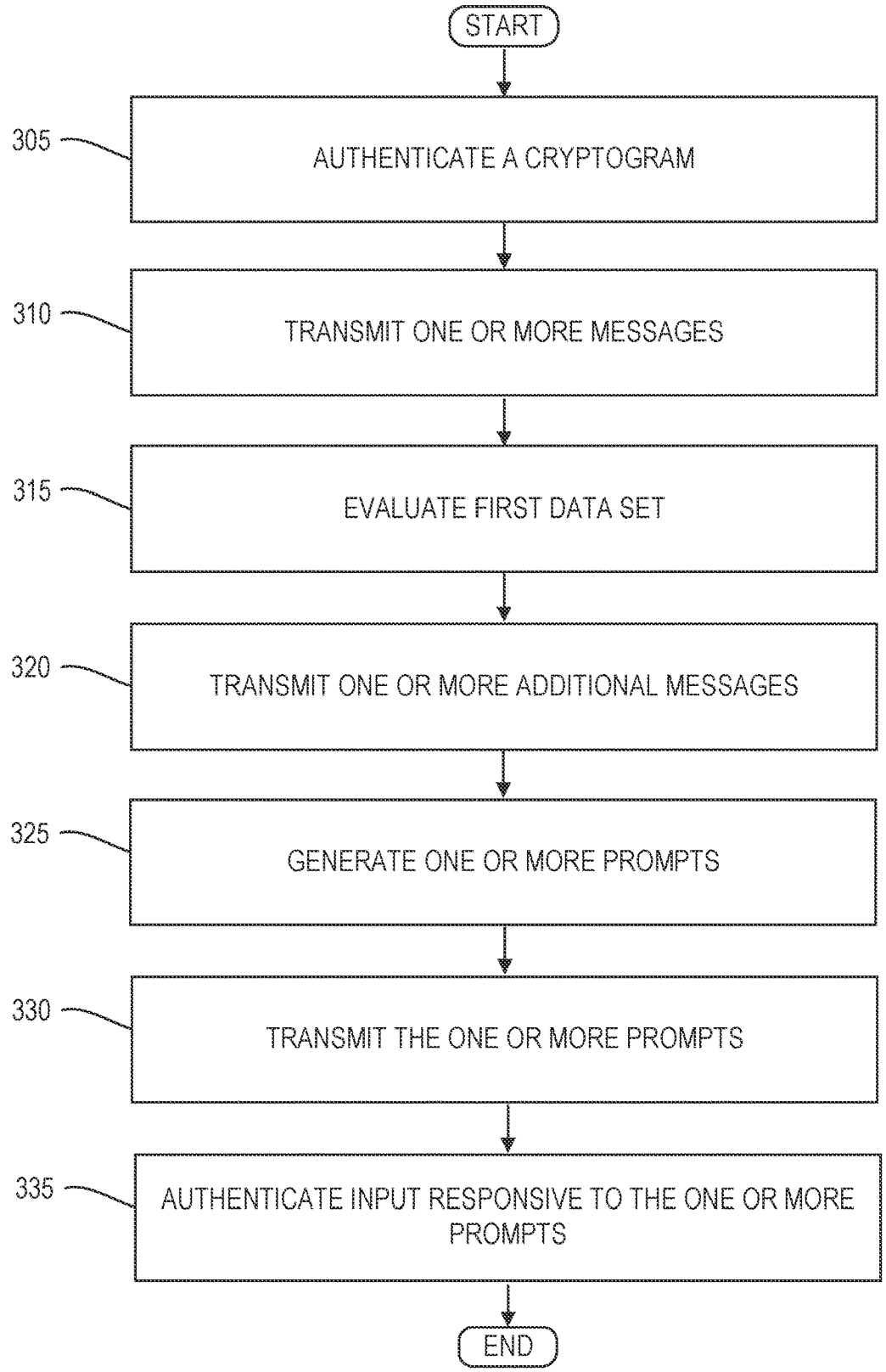
FIG. 3 depicts an authentication method according to an exemplary embodiment.

FIG. 3 depicts a method 300 of authentication. FIG. 3 may reference the same or similar components of system 100, and first device 200 of FIG. 2A and FIG. 2B.

At block 305, the method 300 may include authenticating a cryptogram. For example, the cryptogram may be authenticated as part of a first factor authentication. In some examples, an application comprising instructions for execution on a device may be configured to perform the first factor authentication. In other examples, a server may be configured to perform the first factor authentication. For example, the application of the client device may be configured to conduct one or more reads of a card as part of a first factor authentication. For example, the application may be configured to conduct a read, such as a near field communication read, of a tag, such as a near field communication tag, of the card. The card may be configured to transmit a cryptogram. For example, the card may be configured to transmit, after entry into one or more communication fields of any device, data responsive to the read, such as a first read, via a communication interface of the card. In some examples, the card may be configured to transmit, after a first entry into a first communication field of the device, the cryptogram. Without limitation, each entry may be associated with a tap, a swipe, a wave, and/or any combination thereof. The application of the client device may be configured to receive the cryptogram transmitted by the card. The cryptogram may be generated based on a first read of the tag of the card. For example, the cryptogram may be obtained via a near field communication data exchange format (NDEF) read. In some examples, the card may be configured to encrypt the cryptogram prior to its transmission.

The application of the client device may be configured to transmit the cryptogram that it received from the card to a server. In some examples, the server may be configured to receive the cryptogram transmitted by the card. The server may be configured to decrypt the cryptogram as part of the first factor authentication. In other examples, the application of the client device may be configured to decrypt the cryptogram as part of the first factor authentication.

At block 310, the method 300 may include transmitting one or more messages. For example, the server may be configured to transmit one or more messages to the application of the client device. For example, one of the messages may comprise an indication of authentication status of the cryptogram. For example, the server may be configure to transmit a message to the application of the client device that is indicative of authentication validation, such as a successful authentication status of the cryptogram. To the extent that the server is unable to authenticate the cryptogram, the server may be configured to transmit a message indicative of an unsuccessful authentication status of the cryptogram. If the cryptogram is not successfully authenticated, the server may be configured to instruct, via one or more commands, the client application of the client device to re-read the tag of the card to receive the cryptogram. In this manner, the server may be configured to decrypt the cryptogram as part of the first factor authentication. In some examples, the server may be configured to transmit one or more messages that are instructive of performing a second factor authentication.

At block 315, the method 300 may include evaluating a first data set. For example, the application of the device may be configured to receive the one or more messages from the server. The application of the device may be configured to perform, after the first factor authentication, another read. For example, the application of the device may be configured to perform a second read of the card. The card may be configured to transmit, after the second read, a first data set. For example, the first data set may be obtained via the second read, such as a near field communication data exchange format (NDEF) read. The first data set may be transmitted by the card to the application of the client device via the second read. The first data set may comprise one or more sets of prior data. Without limitation, the first data set may include data for the last three transactions, such as an identifier associated with the first data set, a type of first data set, method of entry into the communication field, time stamp, and amount. The second read may be associated with one or more gestures, including but not limited to a tap, a swipe, or a wave, that represent any number of entries of a communication interface of the card into a communication field of the device.

The application of the client device may be configured to perform a second factor authentication. For example, the one or more sets of prior data may be evaluated against one or more reference sets of prior data as part of the second factor authentication. In other examples, the application of the client device may be configured to transmit the data to the server for evaluation as part of the second factor authentication.

At block 320, the method 300 may include transmitting one or more additional messages. For example, the application of the client device may be configured to generate an outcome of the second factor authentication by comparing the one or more sets of prior data to one or more reference sets of prior data. Based on the outcome of the second factor authentication, the application of the client device may be configured to generate and display one or more additional messages that are indicative of the outcome of the second factor authentication. In other examples, the server may be configured to generate and transmit one or more additional messages that are indicative of the outcome of the second factor authentication. In addition, prior to performance of a second factor authentication, the application of the client device, or server, may be configured to extract metadata from the first data set. The metadata may be extracted from the first device. In some examples, the second factor authentication may include authentication of metadata. For example, the second factor authentication may comprise authentication of metadata of the card. In some examples, the metadata belonging to the first device may be personalized at the time of creation of the first device, for example by the issuer. The metadata of the first device may be customized such that it is populated to include, without limitation, a plurality of fields comprising one or more prior transactions (including merchant and transaction data for a predetermined number of transactions, such as five transactions), one or more transaction date and time stamps, one or more phone numbers, one or more addresses, and/or combination thereof and/or any other personally identifiable information that is capable of being authenticated. In some examples, the mobile phone number associated with the user or account may be read from the first device, and a second factor authentication may be transmitted to the application of client device. For example, the second factor authentication may comprise a short message system one-time password received by application of the client device.

At block 325, the method 300 may include generating one or more prompts. For example, the server may be configured to generate one or more prompts. In other examples, the application of the device may be configured to generate one or more prompts. The application of the client device may be configured to perform a third factor authentication. The third factor authentication may be performed prior to conversion of a first type of operation to a second type of operation by the application of the client device. In other examples, the server or application of the client device may be configured to generate, transmit and/or receive one or more messages indicative of the outcome of the second factor authentication. For example, at least one of the messages may be configured to instruct the application or server to effectuate one or more actions. The one or more actions may include conversion of the first type of operation to a second type of operation. For example, the first type of operation may comprise a card-not-present transaction. The second type of operation may comprise a card-present transaction. In this manner, the conversion may allow for improved security by indicating that the card was present for performing one or more operations, such as capturing a communication with card readers, contactless or contact-enabled terminals. In this manner, the conversion from the first type of operation to the second type of operation may be dependent on the outcome, such as the successful outcome, of the second factor authentication, since the first device will be have been proven to be in physical possession of the user, thereby distinguishing between a card-present transaction and a card-not-present transaction. Moreover, the third factor authentication may be performed after the second factor authentication. For example, the application of the client device may be configured to perform the third factor authentication by generating one or more prompts that are transmitted via one or more notifications. In some examples, the third factor authentication may be performed by prompting, via the one or more notifications, input that is responsive to one or more queries.

Without limitation, the one or more queries may include at least one selected from the group of a primary account number, cardholder identifier such as first name, middle name, last name, a type of operation, a date, a nationality of the cardholder, a cardholder language, an address, a date of birth, an email, a telephone number, an expiration date, a credit card number, a debit card number, and/or any combination thereof. Moreover, the one or more queries may include a request for a partial portion, including but not limited to a redacted portion, of any number of these queries. The one or more queries may resemble knowledge-based authentication that form the basis of the third factor authentication.

At block 330, the method 300 may include transmitting the one or more prompts. In some examples, the server may be configured to transmit the one or more prompts. For example, the server may be configured to transmit the one or more prompts to the application of the device.

At block 335, the method 300 may include authenticating input responsive to the one or more queries. For example, the server may be configured to receive input responsive to the one or more queries. In another example, the application may be configured to receive input that is responsive to the one or more queries. For example, the application of the client device may be configured to transmit the received input to the server for authentication. The application of the device may be configured to authenticate the received input responsive to the one or more queries by comparing reference input to the received input. After successfully authenticating the input, for example, by the application of the client device or the server, the application of the client device or the server may be configured to convert a first type of operation to a second type of operation. The third factor authentication may be performed prior to conversion of a first type of operation to a second type of operation by the application of the client device. In other examples, the server or application of the client device may be configured to generate, transmit and/or receive one or more messages indicative of the outcome of the second factor authentication. For example, at least one of the messages may be configured to instruct the application or server to effectuate one or more actions. The one or more actions may include conversion of the first type of operation to a second type of operation. For example, the first type of operation may comprise a card-not-present transaction. The second type of operation may comprise a card-present transaction. In this manner, the conversion may allow for improved security by indicating that the card was present for performing one or more operations, such as capturing a communication with card readers, contactless or contact-enabled terminals. In this manner, the conversion from the first type of operation to the second type of operation may be dependent on the outcome, such as the successful outcome, of the second factor authentication, since the first device will be have been proven to be in physical possession of the user, thereby distinguishing between a card-present transaction and a card-not-present transaction. In some examples, the application of the client device may be configured to receive and authenticate the input via one or more responses that are responsive to the queries posed in the one or more prompts. In other examples, the application of the client device may be configured to transmit input that it received via one or more responses that are responsive to the queries posed in the one or prompts to a server for authentication. The server may be configured to transmit the received input to a database for authentication of the input and conversion of the transaction.

The application of the client device or the server may be configured to receive input that is responsive to the one or more queries. For example, the input to the one or more queries may include a response that includes an answer as to how many times the user shopped at a particular merchant, or conducted an operation with a specified reader or terminal, within a time frame. In another example, the input to the one or more queries may include a response that includes an answer as to how many items were associated with the most recent purchase. In another example, the input to the one or more queries may include a response that includes an amount spent associated with the most recent purchase. In another example, the input to the one or more queries may include a response that includes an answer as to a location and/or an identity of the last two transactions.

Figure 4:
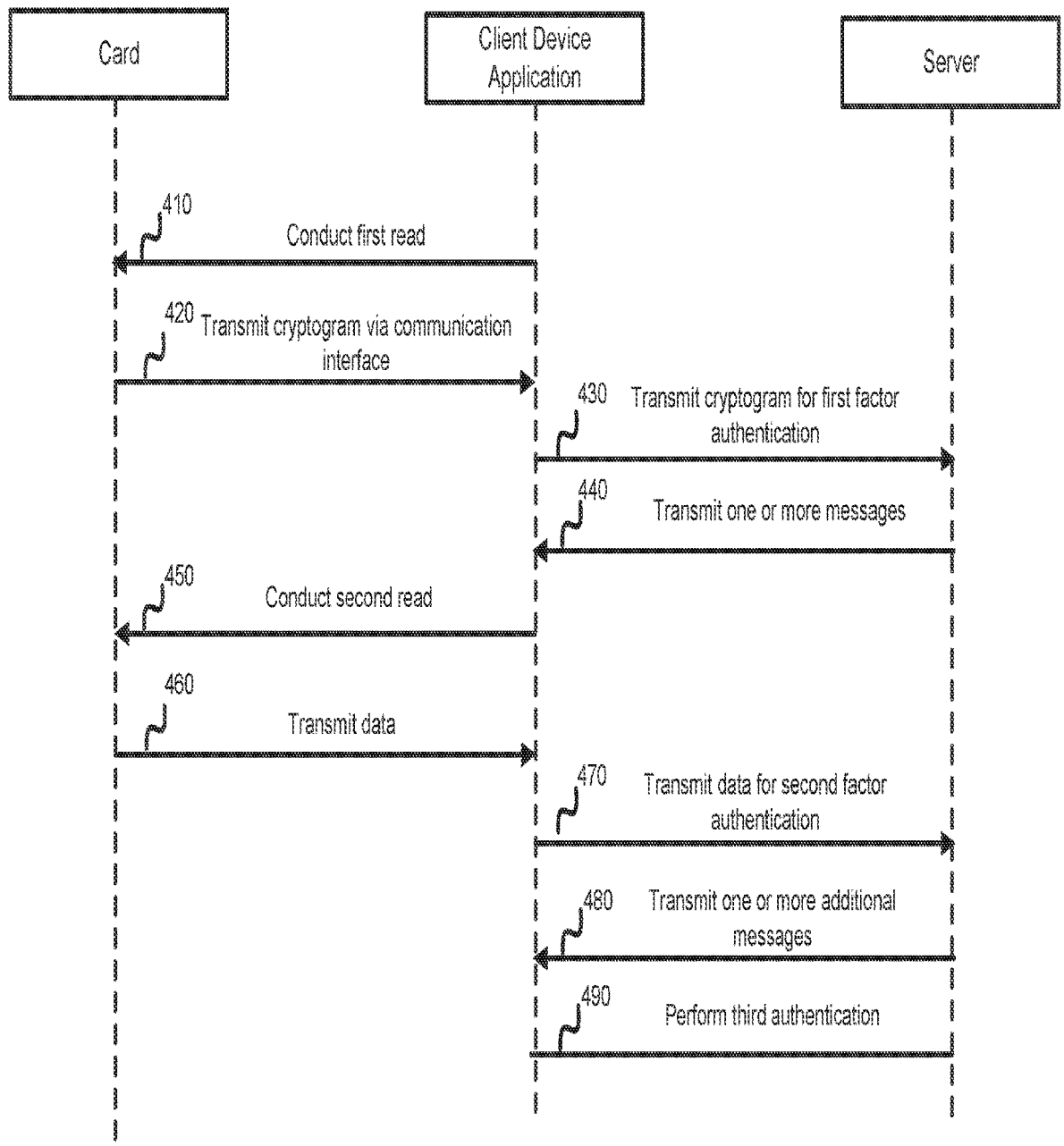
FIG. 4 depicts a sequence diagram of an authentication process according to an exemplary embodiment.

FIG. 4 depicts a sequence diagram 400 of an authentication process according to an exemplary embodiment. FIG. 4 may reference the same or similar components of system 100, first device 200 of FIG. 2A and FIG. 2B, and method 300 of FIG. 3.

At step 410, an application of a client device may be configured to conduct one or more reads of a card as part of a first factor authentication. For example, the application may be configured to conduct a read, such as a near field communication read, of a tag, such as a near field communication tag, of the card.

At step 420, the card may be configured to transmit a cryptogram. The card may be configured to transmit, after entry into one or more communication fields of any device, data responsive to the read, such as a first read, via a communication interface of the card. For example, the card may be configured to transmit, after a first entry into a first communication field of the device, the cryptogram. Without limitation, each entry may be associated with a tap, a swipe, a wave, and/or any combination thereof. The application of the client device may be configured to receive the cryptogram transmitted by the card. The cryptogram may be generated based on a first read of the tag of the card. For example, the cryptogram may be obtained via a near field communication data exchange format (NDEF) read. In some examples, the card may be configured to encrypt the cryptogram prior to its transmission.

At step 430, the application of the client device may be configured to transmit the cryptogram that it received from the card to a server. In some examples, the server may be configured to receive the cryptogram transmitted by the card. The server may be configured to decrypt the cryptogram as part of the first factor authentication. In other examples, the application of the client device may be configured to decrypt the cryptogram as part of the first factor authentication.

At step 440, the server may be configured to transmit one or more messages to the application of the client device. For example, one of the messages may comprise an indication of authentication status of the cryptogram. For example, the server may be configure to transmit a message to the application of the client device that is indicative of authentication validation, such as a successful authentication status of the cryptogram. To the extent that the server is unable to authenticate the cryptogram, the server may be configured to transmit a message indicative of an unsuccessful authentication status of the cryptogram. If the cryptogram is not successfully authenticated, the server may be configured to instruct, via one or more commands, the client application of the client device to re-read the tag of the card to receive the cryptogram. In this manner, the server may be configured to decrypt the cryptogram as part of the first factor authentication.

At step 450, the application of the device may be configured to receive the one or more messages from the server. The application of the device may be configured to perform, after the first factor authentication, another read. For example, the application of the device may be configured to perform a second read of the card.

At step 460, the card may be configured to transmit, after the second read, data such as a first data set. For example, the first data set may be obtained via a second near field communication data exchange format (NDEF) read. The first data set may be transmitted by the card to the processor via the read. The first data set may comprise one or more sets of prior data. Without limitation, the first data set may include data for the last three transactions, such as an identifier associated with the first data set, a type of first data set, method of entry into the communication field, time stamp, and amount. The second read may be associated with one or more gestures, including but not limited to a tap, a swipe, or a wave, that represent any number of entries of a communication interface of the card into a communication field of the device.

At step 470, the application of the client device may be configured to perform a second factor authentication. For example, the one or more sets of prior data may be evaluated against one or more reference sets of prior data as part of the second factor authentication. In other examples, the application of the client device may be configured to transmit the first data set to the server for evaluation as part of the second factor authentication. For example, the server may be configured to perform the second factor authentication of the first data set by generating an outcome of the second factor authentication by comparing the one or more sets of prior data to one or more reference sets of prior data. The reference sets of prior data may be stored in the server. In other example, the one or more reference sets of prior data may be accessible by the server and retrieved from a database. In other examples, the application of the client device may be configured to generate an outcome of the second factor authentication by comparing the one or more sets of prior data to one or more reference sets of prior data. Based on the outcome of the second factor authentication, the application of the client device may be configured to generate and display one or more messages that are indicative of the outcome of the second factor authentication.

At step 480, the server may be configured to transmit one or more additional messages indicative of the outcome of the second factor authentication of the first data set. The server may be configured to instruct, via the one or more additional messages, the application of the client device to perform the second factor authentication.

At step 490, the application of the client device may be configured to perform a third factor authentication. The third factor authentication may be performed prior to conversion of a first type of operation to a second type of operation by the application of the client device. In other examples, the server or application of the client device may be configured to generate, transmit and/or receive one or more messages indicative of the outcome of the second factor authentication. For example, at least one of the messages may be configured to instruct the application or server to effectuate one or more actions. The one or more actions may include conversion of the first type of operation to a second type of operation. For example, the first type of operation may comprise a card-not-present transaction. The second type of operation may comprise a card-present transaction. In this manner, the conversion may allow for improved security by indicating that the card was present for performing one or more operations, such as capturing a communication with card readers, contactless or contact-enabled terminals. In this manner, the conversion from the first type of operation to the second type of operation may be dependent on the outcome, such as the successful outcome, of the second factor authentication, since the first device will be have been proven to be in physical possession of the user, thereby distinguishing between a card-present transaction and a card-not-present transaction. Moreover, the third factor authentication may be performed after the second factor authentication. In other examples, the server may be configured to perform the third factor authentication. In some examples, the server may be configured to instruct the application of the client device to perform the third factor authentication. For example, the application of the client device may be configured to perform the third factor authentication by generating one or more prompts that are transmitted via one or more notifications. In some examples, the third factor authentication may be performed by prompting, via the one or more notifications, input that is responsive to one or more queries.

Without limitation, the one or more queries may include at least one selected from the group of a primary account number, cardholder identifier such as first name, middle name, last name, a type of operation, a date, a nationality of the cardholder, a cardholder language, an address, a date of birth, an email, a telephone number, an expiration date, a credit card number, a debit card number, and/or any combination thereof. Moreover, the one or more queries may include a request for a partial portion, including but not limited to a redacted portion, of any number of these queries. The one or more queries may resemble knowledge-based authentication that form the basis of the third factor authentication.

The application of the client device may be configured to receive input that is responsive to the one or more queries. For example, the input to the one or more queries may include a response that includes an answer as to how many times the user shopped at a particular merchant, or conducted an operation with a specified reader or terminal, within a time frame. In another example, the input to the one or more queries may include a response that includes an answer as to how many items were associated with the most recent purchase. In another example, the input to the one or more queries may include a response that includes an amount spent associated with the most recent purchase. In another example, the input to the one or more queries may include a response that includes an answer as to a location and/or an identity of the last two transactions.

Figure 5:
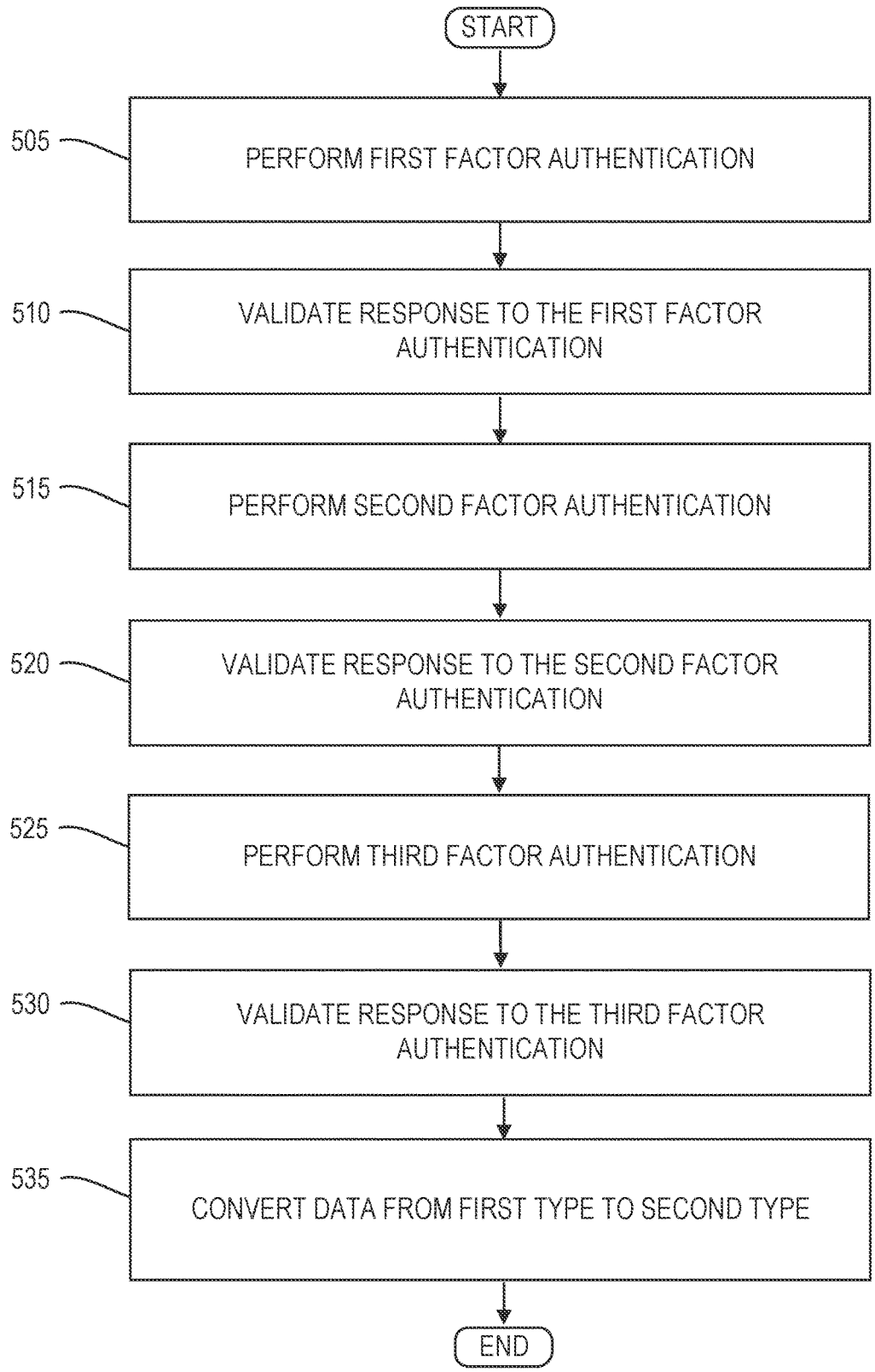
FIG. 5 depicts an authentication method according to an exemplary embodiment.

FIG. 5 depicts a method of 500 of authentication according to an exemplary embodiment. FIG. 5 may reference the same or similar components of system 100, first device 200 of FIG. 2A and FIG. 2B, method 300 of FIG. 3, and sequence diagram 400 of FIG. 4.

At block 505, the method 500 may include performing a first factor authentication. For example, an application of a client device may be configured to perform a first factor authentication. In other examples, a server may be configured to perform a first factor authentication. The application of the client device may be configured to conduct one or more reads of a card as part of a first factor authentication. For example, the application may be configured to conduct a read, such as a near field communication read, of a tag, such as a near field communication tag, of the card.

At block 510, the method 500 may include validating a response to the first factor authentication. In some examples, the application of the client device may be configured to receive a response to the first factor authentication. The response may include a cryptogram. The application of the client device may be configured to validate the response to the first factor authentication. The card may be configured to transmit, via a response, a cryptogram. The card may be configured to transmit, after entry into one or more communication fields of any device, data responsive to the read, such as a first read, via a communication interface of the card. For example, the card may be configured to transmit, after a first entry into a first communication field of the device, the cryptogram. Without limitation, each entry may be associated with a tap, a swipe, a wave, and/or any combination thereof. The application of the client device may be configured to receive the cryptogram transmitted by the card. The cryptogram may be generated based on a first read of the tag of the card. For example, the cryptogram may be obtained via a near field communication data exchange format (NDEF) read. In some examples, the card may be configured to encrypt the cryptogram prior to its transmission. In some examples, the application of the client device may be configured to decrypt the cryptogram as part of the first factor authentication.

In other examples, the server may be configured to receive a response to the first factor authentication. The application of the client device may be configured to transmit the cryptogram that it received from the card to a server. In some examples, the server may be configured to receive the cryptogram transmitted by the card. The server may be configured to decrypt the cryptogram as part of the first factor authentication.

At block 515, the method 500 may include performing a second factor authentication. For example, the application of the client device may be configured to perform a second factor authentication. The application of the device may be configured to perform, after the first factor authentication, another read. For example, the application of the device may be configured to perform a second read of the card. The card may be configured to transmit, after the second read, data such as a first data set. For example, the first data set may be obtained via a second near field communication data exchange format (NDEF) read. The first data set may be transmitted by the card to the processor via the second read. The second read may be associated with one or more gestures, including but not limited to a tap, a swipe, or a wave, that represent any number of entries of a communication interface of the card into a communication field of the device.

In other examples, a server may be configured to perform a second factor authentication. For example, the server may be configured to transmit one or more messages to the application of the client device that indicates instruction of performance of the second factor authentication by the application of the client device or by the server.

At block 520, the method 500 may include validating a response to the second factor authentication. In some examples, the application of the client device may be configured to receive a response to the second factor authentication. For example, the application of the client device may be configured to receive a response including the first data set to the second factor authentication. The first data set may comprise one or more sets of prior data. Without limitation, the first data set may include data for the last three transactions, such as an identifier associated with the first data set, a type of first data set, method of entry into the communication field, time stamp, and amount.

The application of the client device may be configured to validate the response to the second factor authentication. For example, the one or more sets of prior data may be evaluated against one or more reference sets of prior data as part of the second factor authentication. In other examples, the application of the client device may be configured to generate an outcome of the second factor authentication by comparing the one or more sets of prior data to one or more reference sets of prior data. Based on the outcome of the second factor authentication, the application of the client device may be configured to generate and display one or more messages that are indicative of the outcome of the second factor authentication.

In other examples, the server may be configured to receive a response to the second factor authentication. For example, the server may be configured to validate the response to the second factor authentication. The application of the client device may be configured to transmit the first data set to the server for evaluation as part of the second factor authentication. For example, the server may be configured to perform the second factor authentication of the first data set by generating an outcome of the second factor authentication by comparing the one or more sets of prior data to one or more reference sets of prior data. The reference sets of prior data may be stored in the server. In other example, the one or more reference sets of prior data may be accessible by the server and retrieved from a database.

At block 525, the method 500 may include performing a third factor authentication. For example, the application of a client device may be configured to perform a third factor authentication. The third factor authentication may be performed prior to conversion of a first type of operation to a second type of operation by the application of the client device. In other examples, the server or application of the client device may be configured to generate, transmit and/or receive one or more messages indicative of the outcome of the second factor authentication. For example, at least one of the messages may be configured to instruct the application or server to effectuate one or more actions. The one or more actions may include conversion of the first type of operation to a second type of operation. For example, the first type of operation may comprise a card-not-present transaction. The second type of operation may comprise a card-present transaction. In this manner, the conversion may allow for improved security by indicating that the card was present for performing one or more operations, such as capturing a communication with card readers, contactless or contact-enabled terminals. In this manner, the conversion from the first type of operation to the second type of operation may be dependent on the outcome, such as the successful outcome, of the second factor authentication, since the first device will be have been proven to be in physical possession of the user, thereby distinguishing between a card-present transaction and a card-not-present transaction. Moreover, the third factor authentication may be performed after the second factor authentication. For example, the application of the client device may be configured to perform the third factor authentication by generating one or more prompts that are transmitted via one or more notifications. In some examples, the third factor authentication may be performed by prompting, via the one or more notifications, input that is responsive to one or more queries.

Without limitation, the one or more queries may include at least one selected from the group of a primary account number, cardholder identifier such as first name, middle name, last name, a type of operation, a date, a nationality of the cardholder, a cardholder language, an address, a date of birth, an email, a telephone number, an expiration date, a credit card number, a debit card number, and/or any combination thereof. Moreover, the one or more queries may include a request for a partial portion, including but not limited to a redacted portion, of any number of these queries. The one or more queries may resemble knowledge-based authentication that form the basis of the third factor authentication.

In other examples, the server may be configured to perform the third factor authentication. In some examples, the server may be configured to instruct the application of the client device to perform the third factor authentication.

At block 530, the method 500 may include validating a response to the third factor authentication. For example, the application of the client device may be configured to receive input that is responsive to the one or more queries. The application of the device may be configured to authenticate the received input responsive to the one or more queries by comparing reference input to the received input. In some examples, the application of the client device may be configured to receive a response to the third factor authentication. For example, the application of the client device may be configured to validate the response to the third factor authentication. The application of the client device may be configured to receive input that is responsive to the one or more queries. For example, the input to the one or more queries may include a response that includes an answer as to how many times the user shopped at a particular merchant, or conducted an operation with a specified reader or terminal, within a time frame. In another example, the input to the one or more queries may include a response that includes an answer as to how many items were associated with the most recent purchase. In another example, the input to the one or more queries may include a response that includes an amount spent associated with the most recent purchase. In another example, the input to the one or more queries may include a response that includes an answer as to a location and/or an identity of the last two transactions.

In other examples, the server may be configured to receive a response to the third factor authentication. For example, the server may be configured to validate the response to the third factor authentication. The server may be configured to validate the input for the third factor authentication.

At block 535, the method 500 may include converting data from a first type to a second type. After successfully authenticating the input, for example, by the application of the client device or the server, the application of the client device or the server may be configured to convert a transaction from a card-not-present transaction to card-present transaction, the transaction associated with the first data set. In some examples, the application of the client device may be configured to receive and authenticate the input via one or more responses that are responsive to the queries posed in the one or more prompts. In other examples, the application of the client device may be configured to transmit input that it received via one or more responses that are responsive to the queries posed in the one or prompts to a server for authentication. The server may be configured to transmit the received input to a database for authentication of the input and conversion of the transaction.

The application of the client device or the server may be configured to receive input that is responsive to the one or more queries. For example, the input to the one or more queries may include a response that includes an answer as to how many times the user shopped at a particular merchant, or conducted an operation with a specified reader or terminal, within a time frame. In another example, the input to the one or more queries may include a response that includes an answer as to how many items were associated with the most recent purchase. In another example, the input to the one or more queries may include a response that includes an amount spent associated with the most recent purchase. In another example, the input to the one or more queries may include a response that includes an answer as to a location and/or an identity of the last two transactions. In another example, the application of the client device may be configured to transmit the received input to the server for authentication.

Figure 6:
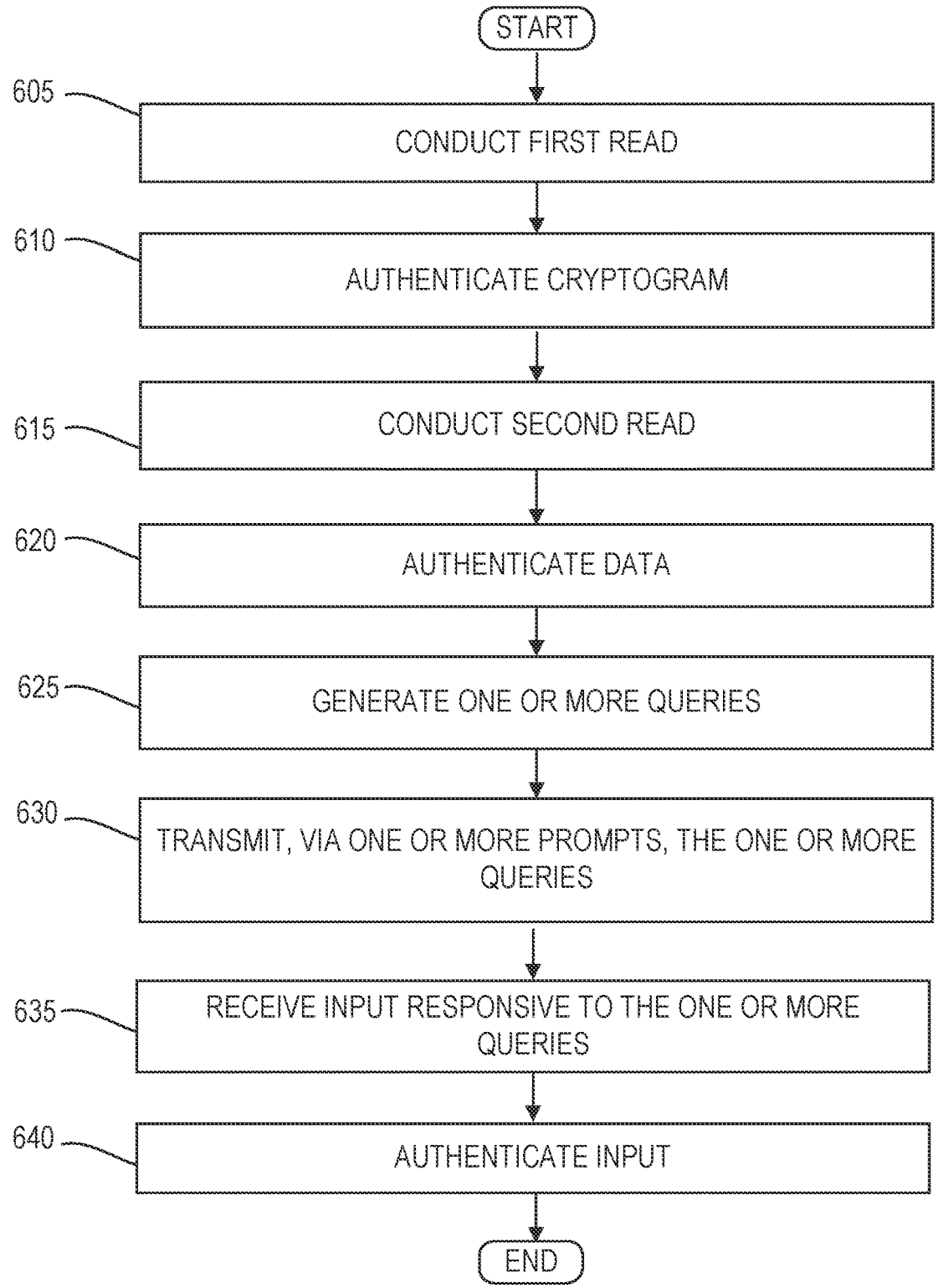
FIG. 6 depicts an authentication method according to an exemplary embodiment.

FIG. 6 depicts an authentication method 600 according to an exemplary embodiment. FIG. 6 may reference the same or similar components of system 100, first device 200 of FIG. 2A and FIG. 2B, method 300 of FIG. 3, sequence diagram 400 of FIG. 4, and method 500 of FIG. 5.

At block 605, the method 600 may include conducting a first read. For example, the first read may be conducted by an application of a device. The device may include one or more processors. The device may include a memory. The device may include an application comprising instructions for execution thereon.

At block 610, the method 600 may include authenticating a cryptogram. The processor may be configured to perform a first factor authentication. In some examples, the first factor authentication may comprise authenticating a cryptogram. For example, the cryptogram may be obtained via a near field communication data exchange format (NDEF) read. The first read of a tag of a card may yield the cryptogram.

At block 615, the method 600 may include conducting a second read. For example, after the first factor authentication, the processor may be configured to perform another read, such as a second read. In some examples, the read performed after the first factor authentication may comprise an NDEF read.

At block 620, the method 600 may include authenticating data. For example, the second read may yield data, such as a first dataset. The first data set may be transmitted by the card to the processor via the read. The first data set may comprise one or more sets of prior data. Without limitation, the first data set may include data for the last three transactions, such as an identifier associated with the first data set, a type of first data set, method of entry into the communication field, time stamp, and amount. The read may be associated with one or more gestures, including but not limited to a tap, a swipe, or a wave, that represent any number of entries of a communication interface of the card into a communication field of the device.

The first data set may be transmitted by the processor for another factor of authentication, such as a second factor authentication. For example, the processor may be configured to transmit the first data set to a server. In some examples, the processor may be configured to transmit the first data set for a second factor authentication. For example, the one or more sets of prior data may be evaluated against one or more reference sets of prior data. The processor may be configured to generate an outcome of the second factor authentication by comparing the one or more sets of prior data to one or more reference sets of prior data. Based on the outcome of the second factor authentication, the processor may be configured to transmit one or more messages that are indicative of the outcome of the second factor authentication.

In another example, the server may be configured to generate an outcome of the second factor authentication by comparing the one or more sets of prior data to one or more reference sets of prior data. The processor may be configured to receive one or more messages indicative of an outcome of the second factor authentication. For example, the processor may be configured to receive, from the server, a message that is indicative of authentication validation, such as a successful outcome of the second factor authentication. In another example, the processor may be configured to receive, from the server, a message that is indicative of an unsuccessful outcome of the second factor authentication. To the extent that the processor is configured to receive a message that is indicative of the unsuccessful outcome of the second factor authentication, the processor may be configured to re-transmit the first data set for second factor authentication. For example, the processor may be configured to retransmit the first data set for second factor authentication up to and including a predetermined number corresponding to a threshold. After the threshold has been reached, the processor may be configured to halt the authentication process. In another example, to the extent that the processor is configured to receive a message that is indicative of the unsuccessful outcome of the second factor authentication, the processor may be configured to halt the authentication process.

Prior to performance of a second factor authentication, the application of the client device, or server, may be configured to extract metadata from the first data set. The metadata may be extracted from the first device. In some examples, the second factor authentication may include authentication of metadata. For example, the second factor authentication may comprise authentication of metadata of the first device. In some examples, the metadata belonging to the first device may be personalized at the time of creation of the first device, for example by the issuer. The metadata of the first device may be customized such that it is populated to include, without limitation, a plurality of fields comprising one or more prior transactions (including merchant and transaction data for a predetermined number of transactions, such as five transactions), one or more transaction date and time stamps, one or more phone numbers, one or more addresses, and/or combination thereof and/or any other personally identifiable information that is capable of being authenticated. In some examples, the mobile phone number associated with the user or account may be read from the first device, and a second factor authentication may be transmitted to the application of client device. For example, the second factor authentication may comprise a short message system one-time password received by application of the client device.

After receipt of the message that is indicative of the outcome of the second factor authentication, the processor may be configured to convert a transaction from a card-not-present transaction to a card-present transaction. In some examples, the transaction may be associated with the transaction data.

At block 625, the method 600 may include generate one or more queries. For example, the processor may be configured to perform a third factor authentication. The third factor authentication may be performed prior to conversion of a first type of operation to a second type of operation by the application of the client device. In other examples, the server or application of the client device may be configured to generate, transmit and/or receive one or more messages indicative of the outcome of the second factor authentication. For example, at least one of the messages may be configured to instruct the application or server to effectuate one or more actions. The one or more actions may include conversion of the first type of operation to a second type of operation. For example, the first type of operation may comprise a card-not-present transaction. The second type of operation may comprise a card-present transaction. In this manner, the conversion may allow for improved security by indicating that the card was present for performing one or more operations, such as capturing a communication with card readers, contactless or contact-enabled terminals. In this manner, the conversion from the first type of operation to the second type of operation may be dependent on the outcome, such as the successful outcome, of the second factor authentication, since the first device will be have been proven to be in physical possession of the user, thereby distinguishing between a card-present transaction and a card-not-present transaction. For example, the processor may be configured to perform the third factor authentication by generating one or more prompts that are transmitted via one or more notifications. In some examples, the third factor authentication may be performed by prompting, via the one or more notifications, input that is responsive to one or more queries.

Without limitation, the one or more queries may include at least one selected from the group of a primary account number, cardholder identifier such as first name, middle name, last name, a type of operation, a date, a nationality of the cardholder, a cardholder language, an address, a date of birth, an email, a telephone number, an expiration date, a credit card number, a debit card number, and/or any combination thereof. Moreover, the one or more queries may include a request for a partial portion, including but not limited to a redacted portion, of any number of these queries. The one or more queries may resemble knowledge-based authentication that form the basis of the third factor authentication.

In other examples, the query may include a question requesting how many times has the user shopped at a particular merchant, or conducted an operation with a specified reader or terminal, within a time frame. In another example, the query may include a question requesting how many items were associated with the most recent purchase. In another example, the query may include a question requesting an amount spent associated with the most recent purchase. In another example, the query may include a question requesting a location and/or identity of the last two transactions.

At block 630, the method 600 may include transmitting, via one or more prompts, the one or more queries. For example, the processor may be configured to transmit the one or more queries. In another example, the server may be configured to transmit the one or more queries.

In some examples, the prompt for input for a response to the one or more queries may be time-restricted. For example, the prompt for input may be configured to expire after a predetermined time, including but not limited to seconds, minutes, hours, etc. In another example, the one or more processors may be configured to prompt, after expiration of the predetermined time, additional input that is responsive to the one or more queries. In some examples, the additional input that is responsive to the one or more queries may be different from the input that is initially requested that is responsive to the one or more queries. Thus, the initial set of one or more queries may be different from the additional set of one or more queries.

For example, the processor may be configured to request a middle name of the user via one or more prompts. If no input is received or provided within 10 seconds, the expiration time for input responsive to this query may expire after 10 seconds, and another prompt for input responsive to another query may be generated and transmitted. For example, the processor may be configured to request the last four digits of the primary account number, in which the input must be provided within 15 seconds. In some examples, the predetermined time associated with the additional queries may be different than the predetermined time associated with the initial queries. In other examples, the predetermined time associated with the additional queries may be the same as the predetermined time associated with the initial queries.

In another example, the processor may be configured to generate and transmit a prompt requiring, within 5 seconds, input of the nationality of the user. If no input is received or provided within the 5 seconds, the expiration time for input responsive to the query may expire after 5 seconds, and another prompt for input responsive to another query may be generated and transmitted. For example, the processor may be configured to request the location of the most recent transaction, and whether the transaction was associated with a credit or debit card, in which the input must be provided within 10 seconds.

In some examples, the prompt for input may be associated with a threshold number of the one or more queries. For example, the prompt for input may be associated with any number, such as two queries. After exhaustion of the number of queries, the processor may be configured to determine whether to authenticate the input based on the response input associated with the prompt of the queries. Using the above example, after exhaustion of two queries, the processor may be configured to terminate the received input that is responsive to the queries if it determines that the input is incorrect.

At block 635, the method 600 may include receiving input responsive to the one or more queries. For example, the processor may be configured to receive the input responsive to the one or more queries. In another example, the server may be configured to receive input responsive to the one or more queries.

At block 640, the method 600 may include authenticating the input. For example, the processor may be configured to authenticate, after receipt of the input, the input that is responsive to the one or more queries. In another example, the server may be configured to authenticate, after receipt of the input, the input that is responsive to the one or more queries.

It is further noted that the systems and methods described herein may be tangibly embodied in one of more physical media, such as, but not limited to, a compact disc (CD), a digital versatile disc (DVD), a floppy disk, a hard drive, read only memory (ROM), random access memory (RAM), as well as other physical media capable of data storage. For example, data storage may include random access memory (RAM) and read only memory (ROM), which may be configured to access and store data and information and computer program instructions. Data storage may also include storage media or other suitable type of memory (e.g., such as, for example, RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives, any type of tangible and non-transitory storage medium), where the files that comprise an operating system, application programs including, for example, web browser application, email application and/or other applications, and data files may be stored. The data storage of the network-enabled computer systems may include electronic information, files, and documents stored in various ways, including, for example, a flat file, indexed file, hierarchical database, relational database, such as a database created and maintained with software from, for example, Oracle® Corporation, Microsoft® Excel file, Microsoft® Access file, a solid state storage device, which may include a flash array, a hybrid array, or a server-side product, enterprise storage, which may include online or cloud storage, or any other storage mechanism. Moreover, the figures illustrate various components (e.g., servers, computers, processors, etc.) separately. The functions described as being performed at various components may be performed at other components, and the various components may be combined or separated. Other modifications also may be made.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A method for secure data communication, comprising:
receiving, by a server, a cryptogram, the cryptogram comprising user identification information;
performing, by the server, a first factor authentication, wherein the first factor authentication comprises:
decrypting, by the server, the cryptogram, and
verifying by the server, the user identification information;
transmitting, by the server in response to a successful first factor authentication, a first message to an application executing on a device;
receiving, by the server, a data set from the application;
performing, by the server, a second factor authentication comprising verifying the data set; and
generating, by the server, a second message indicative of a two factor authentication.

2. The method of claim 1, wherein the cryptogram is retrieved from a memory of a contactless card, via near-field communication (NFC), by the device.

3. The method of claim 2, wherein a retrieval of the cryptogram corresponds to a first NFC read of the contactless card by the device.

4. The method of claim 2, wherein the data set is stored on the memory of the contactless card.

5. The method of claim 4, wherein the data set is retrieved from the memory of the contactless card by performing a second NFC read of the contactless card by the device.

6. The method of claim 4, wherein the data set comprises one or more sets of data associated with prior transactions conducted with the contactless card.

7. The method of claim 1, wherein the verifying of the data set, by the server, comprises matching the data set with one or more reference sets of data associated with prior transactions conducted with the contactless card.

8. The method of claim 1, further comprising performing by the server a third-factor authentication by verifying one or more user-provided data retrieved via the device, the one or more user-provided data being retrieved in response to the second message generated by the server.

9. The method of claim 8, wherein the one or more user-provided data comprises one or more of a user personal identification number and a user password.

10. An authentication server, comprising:
a memory; and
a processor configured to:
receive a cryptogram comprising a first set of identification data associated with a user;
perform a first factor authentication of the cryptogram;
receive a second set of identification data comprising one or more metadata associated with the user;
perform, after the first factor authentication, a second factor authentication based on the one or more metadata;
generate a message indicative of an outcome of the second factor authentication; and
transmit the message to a device associated with the user.

11. The authentication server of claim 10, wherein the cryptogram is retrieved from a memory of a contactless card associated with the user.

12. The authentication server of claim 11, wherein the cryptogram is retrieved from the memory of the contactless card, via near-field communication (NFC), by the device associated with the user.

13. The authentication server of claim 12, wherein a retrieval of the cryptogram corresponds to a first NFC read of the contactless card by the device associated with the user.

14. The authentication server of claim 10, wherein the second set of identification data is retrieved from the memory of the contactless card via a second NFC read of the contactless card by the device associated with the user.

15. The authentication server of claim 13, wherein the metadata comprises one or more sets of transaction data associated with prior transactions conducted with the contactless card.

16. The authentication server of claim 10, wherein the processor is further configured to perform a third-factor authentication by verifying one or more user-provided data retrieved via the device, the one or more user-provided data being retrieved in response to the message transmitted by the server.

17. A computer readable non-transitory medium comprising computer executable instructions that, when executed by a server, perform procedures comprising the steps of:
receiving, by the server, a cryptogram, the cryptogram comprising user identification information;

performing, by the server, a first factor authentication, wherein the first factor authentication comprises:
decrypting, by the server, the cryptogram, and
verifying by the server, the user identification information in the cryptogram;
transmitting, by the server in response to a successful first factor authentication, a first message to an application executing on a device;
receiving, by the server, a data set from the application;
performing, by the server, a second factor authentication comprising verifying the data set; and
generating, by the server, a second message indicative of a two factor authentication.

18. The non-transitory medium of claim 17, wherein the cryptogram is retrieved from a memory of a contactless card by performing a first NFC read of the contactless card by the device.

19. The non-transitory medium of claim 18, wherein the data set is stored on the memory of the contactless card and retrieved by performing a second NFC read of the contactless card by the device.

20. The non-transitory medium of claim 19, wherein the data set comprises one or more sets of data associated with prior transactions conducted with the contactless card.

* * * * *